(12) United States Patent
Bernini et al.

(10) Patent No.: US 8,559,966 B2
(45) Date of Patent: *Oct. 15, 2013

(54) METHOD AND SYSTEM FOR DYNAMICALLY CONFIGURING A TELECOMMUNICATIONS NETWORK

(75) Inventors: Antonio Bernini, Turin (IT); Enrico Buracchini, Turin (IT); Paolo Goria, Turin (IT); Alessandro Trogolo, Turin (IT)

(73) Assignee: Telecom Italia S.p.A., Milan (IT)

( * ) Notice: Subject to any disclaimer, the term of this patent is extended or adjusted under 35 U.S.C. 154(b) by 488 days.

This patent is subject to a terminal disclaimer.

(21) Appl. No.: 12/988,138

(22) PCT Filed: Apr. 16, 2008

(86) PCT No.: PCT/EP2008/054598
§ 371 (c)(1),
(2), (4) Date: Dec. 10, 2010

(87) PCT Pub. No.: WO2009/127254
PCT Pub. Date: Oct. 22, 2009

(65) Prior Publication Data
US 2011/0092220 A1    Apr. 21, 2011

(51) Int. Cl.
*H04W 72/00* (2009.01)
(52) U.S. Cl.
USPC .................. 455/452.2; 455/437; 455/425.1; 455/63.1; 455/450; 455/452.1; 455/410
(58) Field of Classification Search
USPC .......... 455/452.2, 437, 425, 452.1, 63.1, 410, 455/450; 370/329, 328, 252, 241, 342, 335, 370/267, 207, 337
See application file for complete search history.

(56) References Cited

U.S. PATENT DOCUMENTS

| | | |
|---|---|---|
| 5,592,480 A | 1/1997 | Carney et al. |
| 6,011,785 A | 1/2000 | Carney et al. |

(Continued)

FOREIGN PATENT DOCUMENTS

WO    WO 2006/064302 A1    6/2006

OTHER PUBLICATIONS

E. Berruto et al., "The New Service Requirements and the Factors Behind Innovation," UMTS—Mobile Communications for the Future, F. Muratore, editor, John Wiley & Sons, Ltd., Chapter 2, pp. 11-39 (2001).

(Continued)

*Primary Examiner* — Joseph Arevalo
(74) *Attorney, Agent, or Firm* — Finnegan, Henderson, Farabow, Garrett & Dunner, L.L.P.

(57) ABSTRACT

A method for configuring a wireless telecommunications network adapted to operate according to at least one radio system, includes a plurality of re-configurable base radio stations, wherein each base radio station is adapted to manage one or more cells of the telecommunications network, and wherein each cell has corresponding radio resources available. The method includes: obtaining measurements of the cells load status; dynamically configuring at least one of the cells by assigning thereto determined available radio resources depending on the measurements of the cell load status. Dynamically configuring includes: based on the measurements of the cell load status, determining at least one candidate radio resource to be assigned to the cell; prior to assigning the candidate radio resource to the cell, forecasting an impact on the network performance at the radio level potentially caused by the assignment of the candidate radio resource to the cell; and in case the forecasted impact complies with predetermined requirements, assigning the candidate radio resource to the cell.

13 Claims, 14 Drawing Sheets

(56) References Cited

U.S. PATENT DOCUMENTS

| | | | |
|---|---|---|---|
| 6,023,622 | A | 2/2000 | Plaschke et al. |
| 6,894,431 | B2 | 5/2005 | Yamazaki et al. |
| 2004/0073899 | A1* | 4/2004 | Luk et al. .................. 717/158 |
| 2005/0197135 | A1 | 9/2005 | Nelson et al. |
| 2007/0149249 | A1* | 6/2007 | Chen et al. .................. 455/561 |
| 2008/0268861 | A1* | 10/2008 | Buracchini et al. ........ 455/452.1 |
| 2009/0235241 | A1* | 9/2009 | Luk et al. .................. 717/153 |

OTHER PUBLICATIONS

E. Buracchini, "The Software Radio Concept," IEEE Communications Magazine, pp. 138-143 (Sep. 2000).

J. Mitola, "The Software Radio Architecture," IEEE Communications Magazine, pp. 26-38 (May 1995).

International Search Report from the European Patent Office in International Application No. PCT/EP2008/054598 mailed Dec. 22, 2008.

* cited by examiner

METHOD AND SYSTEM FOR DYNAMICALLY CONFIGURING A TELECOMMUNICATIONS NETWORK

CROSS REFERENCE TO RELATED APPLICATION

This application is a national phase application based on PCT/EP2008/054598, filed Apr. 16, 2008, the content of which is incorporated herein by reference.

BACKGROUND OF THE INVENTION

1. Field of the Invention

The present invention relates in general to the dynamic configuration of telecommunications networks, particularly cellular mobile radio communications networks (hereinafter also referred to as cellular networks, for conciseness). More specifically, the invention relates to the dynamic configuration of base radio stations of a cellular network.

2. Description of the Related Art

As known, in the context of cellular networks, the exchange of communications in transmission and reception (between a transmitter and a receiver) occurs through radio communications that use respective communication radio channels. In the context of the present description, the term "radio channel" is used for designating the physical resource that univocally identifies the radio connection between a transmitter and a receiver in the cellular network; the radio channel can be of different types, depending on the access technique and the type of system or network.

For example, in the FDMA (Frequency Division Multiple Access) access technique, the radio channel is identified by its frequency; in the TDMA (Time Division Multiple Access) access technique, the radio channel is identified by a time slot; in the CDMA (Code Division Multiple Access) access technique, the radio channel is identified by a code, for example of the orthogonal type. Two or more access techniques can also be combined: in such a case, the radio channel is identified by the characteristic elements of each of the combined access techniques; for example in the GSM (Global System for Mobile communication) system, that, as known, uses a combined FDMA/TDMA access technique, the radio channel is identified by the frequency and time slot pair.

In the context of the present description, the term "system" or "radio system" is used to identify a plurality of elements in a communications network that are mutually coordinated according to a determined criterion or set of criteria (namely a "standard").

The terms "GSM system", "GPRS (General Packet Radio Service) system", "EDGE (Enhanced Data rates for Global Evolution) system", "UMTS (Universal Mobile Telecommunication System) system", "WLAN (Wireless Local Area Network) system" are therefore used to identify the plurality of elements in a communications network related to the corresponding standard.

Cellular networks generally comprise a radio access network and a core network.

The radio access network in turn comprises a plurality of base radio stations, each one adapted to manage one or more cells, and a number of radio control nodes or radio controllers adapted to manage one or more base radio stations.

Depending on the system, the base radio stations take different denominations, being called "BTS" (Base Transceiver Station) in the GSM/GPRS/EDGE system or the 802.16 (WIMAX) system, "NodeB" (Node Base) in the UMTS system, "Access Point" in WLAN (802.11x) systems, while the corresponding radio control nodes or radio controllers are defined as "BSC" (Base Station Controller) in the GSM/GPRS/EDGE, and RNC (Radio Network Controller) in the UMTS system.

The core network comprises core network elements or nodes that have various names, for example "MSC" (Mobile Switching Center), "SGSN" (Serving GPRS Support Node) and "GGSN" (Gateway GPRS Support Node).

In general, the elements composing the radio access network are specific to the cellular system they belong to (for example, BTS and BSC in GSM/GPRS/EDGE systems, NodeB and RNC in UMTS systems) and are not interchangeable among the different systems. The core-network elements, instead, can be used for governing and managing multiple standards or types of systems.

From the hardware viewpoint, every base radio station (shortly, base station) is able to manage a maximum number of radio resources related to the system for which it has been designed, depending on the complexity and amount of hardware it has been equipped with.

In particular, in every base station, the receiving-transmitting capacity can be changed, by increasing or decreasing the number of hardware resources (e.g., transceivers), statically and a posteriori, on the basis of network traffic measurements and consequent cellular re-planning.

The development of different systems that temporally and geographically coexist (in a shared area) poses the technical problem of simultaneously managing in the same area two or more systems so as to make the network meet users' characteristics and optimise the use of resources. Typically, such kind of problem occurs for a radio-mobile network operator or manager that already has a deployed network and wants to add thereto a network compliant to a new-generation system (for example an operator having a GSM/GPRS/EDGE network deployed in the field may wish to add a UMTS network).

In addition to the problem of installing new hardware components and make them coexist with the already existing ones, the network manager may wish to be able to dynamically manage the hardware resources dedicated to the system already deployed and to the new-generation system, depending on the changes in time of the traffic in the cells of the area of interest.

In the art it has been proposed that the operators that in the past installed a second-generation cellular network (e.g., compliant to the GSM/GPRS/EDGE or IS-95—Interim Standard 95), in order to be able to deploy third-generation networks (e.g. UMTS or CDMA 2000—Code Division Multiple Access 2000), shall install completely new hardware elements, particularly base radio stations (NodeB) and radio controllers (RNC).

For example, Flavio Muratore et al., in "UMTS—Mobile Communications for the Future", John Wiley & Sons Ltd., 2001, Chapter 2, dedicated to UMTS, suggest to share the core network part and install a completely new access network uncoupled from the already present access network; in this case, balancing between access networks can only occur by means of physical hardware modification interventions (addition or removal of available resources).

This kind of solution is costly and does not allow a dynamic resources management. Actually, although second- and third-generation base stations are often mutually co-located, radio access networks nodes belonging to different systems are completely uncoupled and independent from one another.

Systems are also known wherein the access network (intended as comprised of mobile terminals, base stations, network nodes and the like) have reconfigurable elements (apparatus and/or devices), as for example disclosed in J. Mitola, "The Software Radio Architecture", IEEE Communications Magazine, May 1995, and E. Buracchini "The Software Radio Concept", IEEE Communications Magazine, September 2000. These reconfigurable systems comprise apparatuses and/or devices whose operation can be reconfigured when desired: for example, a reconfigurable mobile terminal adapted to operate in a second-generation system (e.g., in a GSM/GPRS/EDGE network), can be reconfigured to become able to operate in a third-generation system (e.g., in a UMTS or CDMA 2000 network), or in a WLAN system, or in a DVB-T (Digital Video Broadcasting Terrestrial) system, etc.

In order to be able to configure or reconfigure an apparatus or device, its operating functions have to be implemented by means of a technology that is in turn able to be configured or reconfigured; therefore, reconfigurable devices have a reprogrammable hardware consisting of a set of FPGAs (Field Programmable Gate Arrays), DSPs (Digital Signal Processors) and microprocessors, and the individual device functionalities, even at a lower protocol level, are implemented in software. Consequently, in order to reconfigure such an apparatus it is in general sufficient to replace the operating software that manages the device hardware.

Documents U.S. Pat. No. 5,592,480 and U.S. Pat. No. 6,011,785 describe how to realise a base station of the access network with reconfigurable hardware, that is able to support a plurality of mobile radio system and share processing resources among them. In particular, these documents disclose the architecture of a reconfigurable base station that is able to support many cellular systems and to reconfigure hardware resources depending on the type of traffic in the cells covered by the base station. The reconfigurable base station is realised with reconfigurable hardware using DSPs that allow using several standardised radio interfaces by dynamically redistributing the resources inside the cells. The hardware resources reconfiguration occurs autonomously by the base station itself, that is able to configure or reconfigure itself depending on the traffic in the cells covered by the base station.

When a sufficiently wide set of cells in a certain area (e.g. a town or its centre) is considered, the traffic, generated by one or more different systems, may change even significantly in different hours of the day.

It may also occur that, in some areas (called "hot spots") where the traffic is heavier, one or more congested cells exist, experiencing a high degree of calls/connections blocks, while nearby cells are scarcely loaded or experience low calls/connections blocks percentages.

Document U.S. Pat. No. 6,894,431 discloses, in the context of reconfigurable cellular networks, a method for reconfiguring a cell of a radio system taking into account the co-channel interference. The method is applicable only to cells belonging to a same BTS of a same radio system. The BTS hardware resources can be assigned based on the traffic requirements, proportionally to the traffic demand, among different sectors of a same BTS. The co-channel interference is only evaluated in respect with cells of a same BTS.

Document US 2005/197135 discloses a base station node that includes a radio frequency (RF) monitor and at least one signal processor. The RF monitor is operable to monitor traffic associated with a plurality of wireless communication devices to determine at least one requested load having a corresponding air interface standard. The signal processor is coupled to the RF monitor and is operable to be dynamically reconfigured to support the air interface standard corresponding to the requested load.

Document WO 2006/064302 describes a reconfigurable network architecture capable of adapting to changes in the traffic in respect of one or more radio systems present in a service area, and particularly capable of dynamically reducing calls/connections blocks due to a congestion of at least one cell of a base station, taking into account parameters useful to guarantee the quality of service. The resources that are considered for increasing/reducing the network capacity are the frequencies, both for GSM and for UMTS systems. The capacity of a cell is increased by adding one or more carriers, and it is decreased by eliminating them.

The reconfigurable network architecture allows to dynamically reduce the blockage of a cell or a set of cells managed by a base station and including one or more systems, without recurring, for example, to the addition of further base stations.

SUMMARY OF THE INVENTION

The Applicant observes that the solutions known in the art for dynamically reconfiguring a cellular network are not completely satisfactory, because the reconfiguration is actuated without fully considering the impact it may have.

In particular, in the network architecture proposed in WO 2006/064302 the reconfiguration of the base stations neglects the aspects related to the possible changes in the interference levels generated by the network reconfiguration.

The Applicant believes that this is a non-negligible limitation, because once the reconfiguration is done, the results may depart from the expected ones, and the benefits of the reconfiguration be impaired.

The Applicant has found that a solution to this problem may consist in forecasting, once the changes to be made to the current network configuration have been determined but before deploying them, the impact that the changes may have on the network operation, particularly on the radio quality, for example on interference and network capacity aspects, so as to actually deploy the changes only on condition that the network quality, at the radio access network level, remains acceptable. For the purpose of the present invention, ensuring that the radio quality of the network remains acceptable means in particular that the already active connections/calls do not drop as a consequence of the implemented changes, and that the error rates, delays, latencies of the already active connections/calls remain within prescribed limits. Ensuring that the radio quality of the network remains acceptable involves for example ensuring that interference and capacity requirements are fulfilled.

According to an aspect of the present invention, a method is provided for configuring a wireless telecommunications network adapted to operate according to at least one radio system, the network comprising a plurality of re-configurable base radio stations, wherein each base radio station is adapted to manage one or more cells of said telecommunications network, and wherein each cell has corresponding radio resources available, the method comprising the steps of:

obtaining measurements of the cells load status;

dynamically configuring at least one of the cells by assigning thereto determined available radio resources depending on the measurements of the cell load status, characterized in that said dynamically configuring comprises:

based on the measurements of the cell load status, determining at least one candidate radio resource to be assigned to the cell;

prior to assigning the candidate radio resource to the cell, forecasting an impact on the network performance at the radio level potentially caused by the assignment of the candidate radio resource to the cell; and in case the forecasted impact complies with predetermined requirements, assigning the candidate radio resource to the cell.

Said forecasting an impact on the network performance at the radio level may comprise forecasting a resultant signal-to-noise ratio, and comparing the forecasted signal-to-noise ratio to a predetermined signal-to-noise ratio.

Said predetermined signal-to-noise ratio is for example a minimum value adapted to guarantee the service provided by the wireless telecommunications network.

Said forecasting a resultant signal-to-noise ratio may comprise either a) estimating a re-use distance of the radio resource, or b) calculating the signal-to-noise ratio based on simulations.

Option a) or b) may be chosen depending on the measured cell load status.

Said forecasting an impact on the network performance at the radio level may comprise assessing whether a cell load factor in uplink does not exceed a predetermined load factor threshold.

Said forecasting an impact on the network performance at the radio level may comprise assessing whether a cell transmission power is sufficient for sustaining the assignment of the candidate radio resource.

Said assigning the candidate radio resource to the cell may comprise transferring the candidate radio resource from another cell.

The step of obtaining measurements of the cells load status may comprise measuring in a selected time interval:

the amount of radio traffic in said cells for each of the at least one radio system; and the amount of available and/or unavailable radio resources in said cells for each of the at least one radio system.

The step of measuring in a selected time interval said amount of traffic and said amount of radio resources may comprise measuring at least one set of data included in the group consisting of:

list of radio frequencies assigned and in-use to each one of said cells for each of the at least one radio system;

list of codes assigned and in-use to each of said cells for each of the at least one radio system;

list of time slots assigned and in-use to each one of said cells for each of the at least one radio system;

number of radio frequencies assigned and in-use to each one of said cells for each of the at least one radio system;

number of codes assigned and in-use to each one of said cells for each of the at least one radio system;

number of time slots assigned and in-use per system to each one of said cells.

Said dynamically configuring at least one cell may comprise:

measuring parameters representing the ratio between number of unsatisfied requests and total number of performed requests in each one of said cells for each of the at least one radio system;

based on said measuring parameters, determining, for each of said at least one radio system and for each one of the network cells, a block index having a value representing block conditions or status of each one of said cells;

ordering said cells according to a priority order determined by said block index;

reconfiguring said set of cells depending on said priority order.

Said network may be adapted to operate according to a plurality of cellular systems, and the step of dynamically reconfiguring at least one cell may comprise:

determining a load parameter for each cellular system of said plurality, computed depending on the load status measured for each cell and for a system of said plurality and depending on the global load status measured per cell for said plurality of systems;

using said load parameter per system for transferring said determined radio resources in at least one cell from a first to at least one second system of said plurality of systems.

Said at least one cellular system may be included in the group consisting of:

a system of the GSM type and its evolutions;

a system of the UMTS type and its evolutions, particularly. HSPA Evolution and E-UTRA;

a system of the CdmaOne type and its evolutions;

a system of the Cdma2000 type and its evolutions;

a system of the 802.11 family and its evolutions;

a system of the 802.16 or 802.20 families and their evolutions;

a system of the DVB-T, DVB-S, DVB-H or DAB type.

According to another aspect of the present invention, there is provided a radio resource managing entity for configuring a wireless telecommunications network adapted to operate according to at least one radio system, the radio resources managing entity being configured for implementing the above method.

According to another aspect of the present invention, a wireless communications network comprising the radio resources managing entity is provided.

According to still another aspect of the present invention, there is provided a computer program product, possibly consisting of a set of computer program product parts, that can be loaded in the memory of at least one computer and comprising portions of software code for performing the above method, when the product is run on at least one computer. As used herein, the reference to such computer program product is meant as equivalent to a computer readable medium containing instructions for controlling a computer system in order to coordinate the performance of the process according to the invention. The reference to "at least one computer" is intended to highlight the possibility that the present invention is implemented in a distributed and/or modular way.

BRIEF DESCRIPTION OF THE DRAWINGS

These and other features and advantages of the present invention will be made apparent by the following detailed description of some exemplary embodiments thereof, provided merely by way of non-limitative examples, to be read in conjunction with the attached drawings, wherein.

DETAILED DESCRIPTION OF EMBODIMENTS OF THE INVENTION

Figure 1:
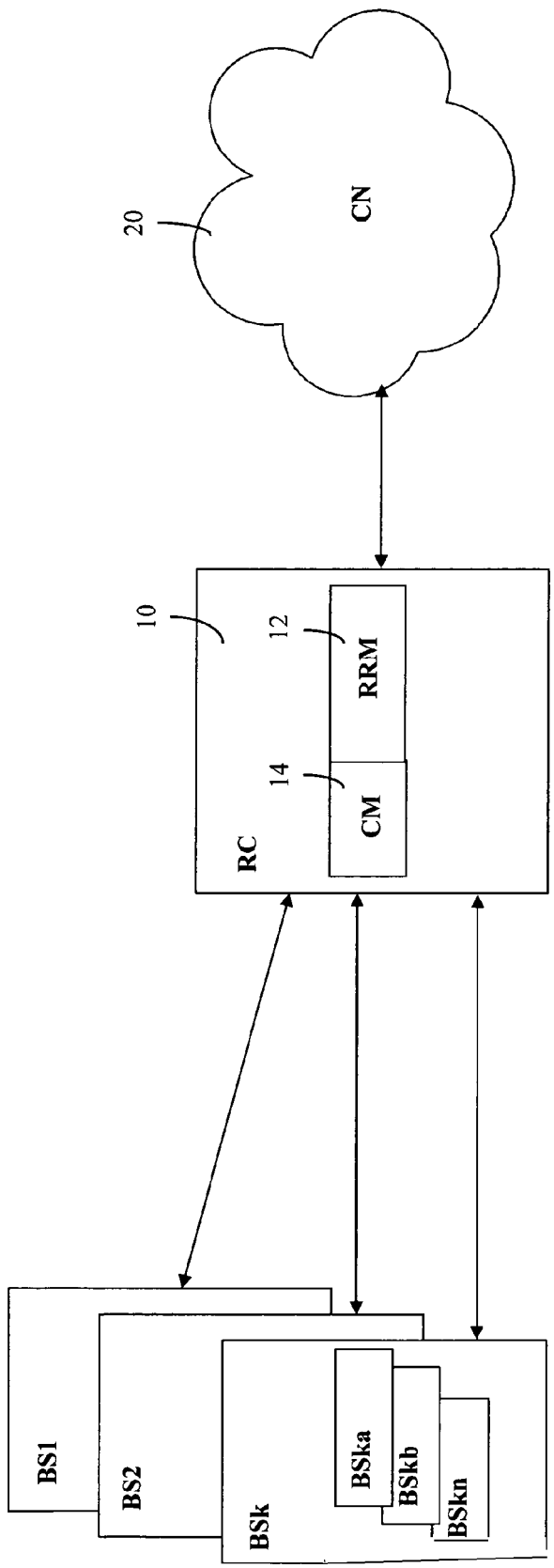
FIG. 1 schematically shows the architecture of a network according to an embodiment of the invention.

With reference to the drawings, an architecture of a network where an embodiment of the present invention is applicable is schematically shown in FIG. 1. In the drawing there is depicted a control node or radio controller (RC) 10 of a radio access network of a cellular system (for example, a BSC node in case of a GSM/GPRS/EDGE system, or an RNC node in case of a UMTS system), a plurality of base stations BS1, BS2, . . . , BSk (BTS stations in case of GSM/GPRS/EDGE and NodeB in case of UMTS) managed by the radio controller 10, and a core network 20, all representing nodes of a generic network in a cellular system. It is intended that, in a real scenario, the network may include a plurality of radio controllers, each one managing a respective (plurality of) base station(s).

Each base station BS1, BS2, . . . , BSk is connected to the respective radio controller 10, that in turn is connected to the core-network 20, by means of conventional connections.

According to an embodiment of the present invention, the base stations BS1, BS2, . . . , BSk are of a re-configurable type, and are capable of supporting different communication systems.

Each base station BS1, BS2, . . . , BSk comprises hardware and/or software receiving-transmitting modules (base station transceivers or transceivers) BSKa, BSKb, . . . , BSKn, of a re-configurable type, and the generic base station BS1, BS2, . . . , BSk is configured for managing the transceivers BSka, BSkb, . . . BSkn depending on protocol messages coming from the radio controller 10, as will be described in detail in the following.

According to an embodiment of the invention, the transceivers BSka, BSkb, . . . , BSkn are adapted to manage one or more radio channels (radio resources) of one or more cells managed by each base station BS1, BS2, . . . , BSk.

The radio controller 10, in turn, is configured for managing the radio resources of the different systems that are used in the mobile network by the base stations BS1, BS2, . . . , BSk, for example BTS stations in case of GSM/GPRS/EDGE and NodeB in case of UMTS.

In an embodiment of the present invention, the radio controller 10 comprises an entity generally designated as RRM (Radio Resource Management) 12, having the purpose of managing requests and the assignment of radio channels by/to mobile terminals that happen to be located in the cells managed by the base stations BS1, BS2, . . . , BSk connected to the radio controller 10. According to an embodiment of the present invention, a radio resources configuration managing entity (hereinafter also referred to as Configuration Manager or CM) 14 is associated with, coupled to the RRM entity 12; the CM 14 is adapted to cooperate with the RRM 12 to allow managing the radio resources of different systems.

In alternative invention embodiments, the radio resources configuration managing entity (the CM 14) may be inserted in a part of the network that is different from the radio controller, for example in the core network. This solution is particularly suitable for managing networks that comprise radio resources adapted to operate according to standards that do not encompass the radio controller function, such as, for example, WLAN, 802.16 (WIMAX) or 802.20, DVB-T, DVB-S, DVB-H systems. Moreover, the radio resources configuration managing entity may be included in a core network node, for example in the MSC (Mobile Switching Centre), of a network that provides for the presence of the radio controller. In this case, the radio resources configuration managing entity can advantageously be configured for cooperating with one or more radio controllers for checking and reconfiguring the plurality of cells controlled by the one or more radio controllers.

The CM 14 is associated with a group of at least two base radio stations of the network. The CM 14 is adapted to monitor and configure the radio resources of the cells connected to the base radio stations associated therewith. Preferably, the CM 14 is equipped with one or more program modules adapted to implement the following functionalities or macro-steps:

monitoring and measuring the load status of cells associated therewith, for example considering the service requests coming from different systems;

checking conditions of cells associated with the CM 14 and, depending on the results of the check, dynamically configuring (or reconfiguring) the cells managed by the base radio stations so that the available hardware resources are shared among the various systems proportionally to the traffic volume required to the cells.

In the following of the present description, it will be assumed that the CM 14 is part of the radio controller; however, this is not to be construed limitatively, and what will be described can be applied, with the suitable modifications readily apparent to those skilled in the art, also to the alternative embodiments wherein the CM is not part of the radio controller.

The radio controller 10 is capable of measuring, by means of the CM 14, the load status of cells managed by the different base stations BS1, BS2, . . . , BSk, and to dynamically reconfigure, based on the results of the measures, the cells of the various base stations BS1, BS2, . . . , BSk, acting on the transceivers BSka, BSkb, . . . , BSkn, by means of reconfiguration commands managed by the CM 14, as will be described in detail in the following.

Figures 2A, 2B:
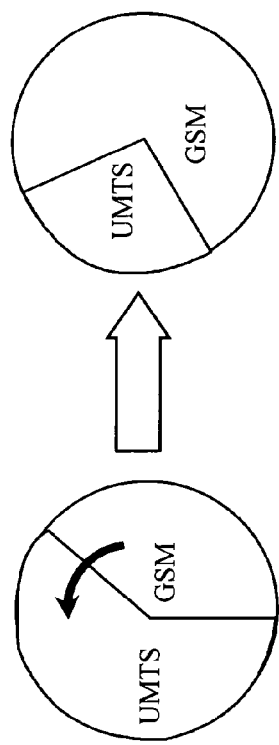
FIGS. 2A and 2B show an example of resources re-allocation between a GSM system and a UMTS system, before and after the re-allocation.

The described architecture allows, for example, optimising the management of radio resources assigned to various communication systems depending on the load experienced by the cells. For example, with reference to FIGS. 2A and 2B, considering two communication systems like the GSM/GPRS/EDGE and the UMTS, and assuming that a group of cells is experiencing a heavy GSM/GPRS/EDGE traffic while the UMTS traffic is relatively scarce, the CM 14, in the described configuration, will take care of reconfiguring the cells' radio resources by acting on the transceivers BSka, BSkb, . . . , BSkn so that most of their processing capabilities are reserved to the GSM/GPRS/EDGE system. Similarly, if in a certain group of cells scarce GSM traffic is experienced, while the UMTS traffic is relatively heavy, the CM 14 will take care of reconfiguring the cells' radio resources by acting on the transceivers BSka, BSkb, . . . , BSkn so that most of their processing capabilities are reserved to the UMTS system.

The CM 14 has therefore the function of monitoring and measuring the activity status of the cells related to the associated base radio stations and, depending on the activity status of the monitored cells, the CM 14 can, if necessary, reconfigure the base radio stations modules by means of suitable reconfiguration commands or messages sent to the transceivers BSka, BSkb, . . . , BSkn, as will be described in detail in the following.

The CM 14 comprises software and/or hardware modules configured for monitoring and/or storing, for example in an internal memory, for every cell, a set of data related to activities in respect of the different communication systems managed in the network.

In the herein described exemplary embodiment of the invention, the generic cell status is meant to include:
an indication of the amount of traffic experienced by that cell, for every communication system present in the cell; and
an indication of the amount of radio resources available and unavailable for that cell, for each communication system. Available resources are those that can be used in a certain cell taking account of possible constraints; unavailable resources are radio resources that cannot be used in a certain cell due to any possible constraint, for example, for the GSM, frequencies that are already used in neighboring cells, and for the UMTS, unusable scrambling codes.

In particular, according to an embodiment of the present invention, the CM 14 is configured for performing the above mentioned macro-steps cyclically, starting, for example, from an initial condition set by the network operator (network manager), depending on network planning parameters; the macro-steps performed by the CM 14 may for example include:
a first macro-step, of time length T (defined for example by the network manager), in which the CM 14 measures and/or stores data indicating a number of GSM and UMTS activities for each controlled cell, as will be better explained later;
a second macro-step, in which the CM 14, depending on the number of measured activities, checks for every cell whether it is necessary to perform a resources reconfiguration of the transceivers BSka, BSkb, . . . , BSkn in the respective base stations BS1, BS2, . . . , BSk, and, if it is necessary, the CM performs the reconfiguration.

In the second macro-step, the dynamic radio resources reconfiguration of the base radio stations BS1, BS2, . . . , BSk is performed by exchanging, between the radio controller 10 and the base radio stations BS1, BS2, . . . , BSk, a set of protocol messages adapted to allow reconfiguring the transceivers BSka, BSkb, . . . , BSkn of the various base radio stations.

In particular, according to an embodiment of the present invention, the messages are generated by the CM 14 and exchanged with the transceivers BSka, BSkb, . . . , BSkn by means of the base radio stations BS1, BS2, . . . , BSk.

Hereinbelow, an example of protocol messages adapted to allow reconfiguring the base radio stations BS1, BS2, . . . , BSk is provided.

The messages can be exchanged between the radio controller 10 and the base radio stations BS1, BS2, . . . , BSk making use of existing connections between the former and the latter, or providing specific connections.

Figure 14:
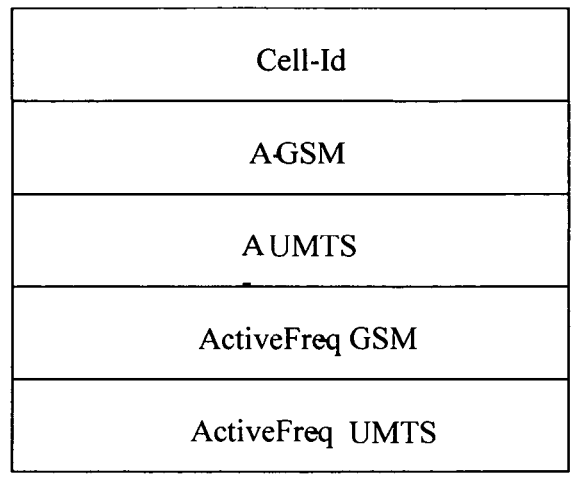
FIGS. 14-16 show the structure of protocol messages according to an embodiment of the invention.
Figure 15:
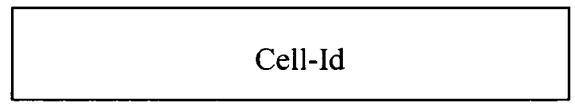
Figure 16:
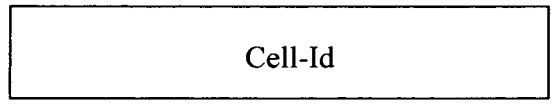

According to an embodiment of the present invention, the messages comprise for example:

a) CELL RECONFIGURATION COMMAND messages, transmitted by the CM 14 to one or more base stations BS1, BS2, . . . , BSk, adapted to control the cell reconfiguration process; a generic message of this type comprises for example at least one of the following fields, shown in FIG. 14:
cell identifier: Cell-Id;
number of GSM resources to be configured: A-GSM;
number of UMTS resources to be configured: A-UMTS;
list of GSM carriers to be activated in the cell: ActiveFreq-GSM;
list of UMTS carriers to be activated in the cell: ActiveFreq-UMTS.

b) CELL RECONFIGURATION COMPLETE messages, transmitted by one or more base stations BS1, BS2, . . . , BSk to the CM 14 and adapted to notify the completion of the cell reconfiguration process; a generic message of this type comprises for example at least the following field, as shown in FIG. 15:
cell identifier: Cell-Id.

c) CELL RECONFIGURATION FAILURE messages, transmitted by one or more base stations BS1, BS2, . . . , BSk to the CM 14 and adapted to notify the failure of the cell reconfiguration process; a generic message of this type comprises for example at least the following field, as shown in FIG. 16:
cell identifier: Cell-Id.

The number and the content of the various messages can be different from the exemplary ones mentioned above; in general, any messages that allow starting, completing or aborting the reconfiguration process may be suitable.

Data related to the cell status according to an embodiment of the present invention are listed hereinbelow. In particular, an example of data used in the case of GSM/GPRS/EDGE and UMTS systems is presented.

Hereinafter, data denoted with "GSM" superscript or subscript are intended to relate to the GSM/GPRS/EDGE system, while data denoted with "UMTS" superscript or subscript are intended to relate to the UMTS system.

In addition, hereinafter, by the terms "neighbor" or "neighboring" referred to cells, it is meant any type of cells neighborhood, e.g. electromagnetic and/or topological neighborhood.

Moreover, in the example herein provided only the frequencies used in the GSM/GPRS/EDGE system, and the frequencies and scrambling codes used in the UMTS system are considered as radio resources. This is however not to be intended as limitative to the present invention, being merely an example of radio resources that can be considered.

In an embodiment of the present invention, the data related to the cells status comprise:
PlannedFreq$_{GSM}$: list of all the GSM frequencies planned for use inside each cell;
ActiveFreq$_{GSM}$: list of currently active GSM frequencies inside each cell;
AvailableFreq$_{GSM}$: list of currently unused GSM frequencies in the considered cell (the current cell) and in cells that are neighbors thereof; this list comprises only the frequencies that are currently unused inside the current cell and the neighboring cells; the list can be obtained through the following expression, in which the index i=0 identifies the current cell, while $1 \leq i \leq k$ identify the k cells that are neighbors to the current cell:

$$\text{AvailableFreq}_{GSM} = \cap_{i=0}^{k} (\text{cells} | \in \text{PlannedFreq}_{GSM}^{i}, \notin \text{ActiveFreq}_{GSM}^{i});$$

AddCarrier$_{GSM}$: new GSM frequency to be assigned to a cell;
DropCarrier$_{GSM}$: GSM frequency to be deactivated from a cell;

$C/I_{THR}$: minimum required value for the overall signal/interference ratio adapted to guarantee the GSM service; this value can be a unique value set by the network manager for all the network, or it can be set on a cell-by-cell basis;

$T_{min}$: minimum value of the time period T in respect of which the network manager desires to calculate the performance of the cells in terms of signal/interference ratio in a simplified way (i.e., based on the concept of re-use distance), as described in greater detail later on;

AvailableFreqEXT$_{GSM}$: list of GSM frequencies not licensed to the network operator and made available from outside the network (for example, GSM frequencies that are licensed to different network operators and that are made available for lease, e.g. by a spectrum broker) for a certain time interval;

Area$_{int}$: area within which the average signal/interference ratio C/I of a cell is calculated based on an exhaustive method (involving the estimation of the C/I), as described in greater detail later on;

R: average cell radius;

PlannedFreq$_{UMTS}$: list of all the UMTS frequencies planned for use inside each cell.

ActiveFreq$_{UMTS}$: list of currently active UMTS frequencies inside each cell;

AvailableFreq$_{UMTS}$: list of currently unused UMTS frequencies in the considered cell (the current cell) and in cells that are neighbors thereto; this list comprises only those frequencies that are currently unused inside the current cell and the cells neighboring thereto; the list can be obtained through the following expression, in which the index i=0 denotes the current cell, while 1≤i≤k denotes the k neighboring cells thereof:

$$\text{AvailableFreq}_{UMTS} = \cap_{i=0}^{k}(\text{cells} \in \text{PlannedFreq}_{UMTS}^{i}, \notin \text{ActiveFreq}_{UMTS}^{i});$$

AddCarrier$_{UMTS}$: new UMTS frequency to be assigned to a cell;

DropCarrier$_{UMTS}$: UMTS frequency to be deactivated from a cell;

ActiveCode$_{UMTSi}$: list of the scrambling codes associated with a UMTS frequency $f_i$ belonging to the list ActiveFreq$_{UMTS}$; the generic element of the list ActiveCode$_{UMTSi}$ is denoted $PSC_j$;

AddCode$_{UMTS}$: new scrambling code to be assigned to a UMTS frequency of a cell;

DropCode$_{UMTS}$: scrambling code to be deactivated in respect of a UMTS frequency of a cell;

AreaActiveCode$_{UMTS}$: list of the scrambling codes currently active in the considered area;

AreaAvailableCode$_{UMTS}$: list of scrambling codes currently unused in the considered area;

AvailableFreqEXT$_{UMTS}$: list of UMTS frequencies made available from outside the network (for example by a spectrum broker) for a certain time interval;

N$_{GSM}$: number of GSM radio channels currently assigned, but not necessarily used, in each cell; it is the maximum number of GSM transceivers that can be activated in each cell according to the current hardware configuration;

N$_{UMTS}$: number of UMTS radio channels currently assigned, but not necessarily used, in each cell; it is the maximum number of UMTS transceivers that can be activated in each cell according to the current hardware configuration;

N$_{tot}$: total number of GSM and UMTS radio channels currently assigned, but not necessarily used, in each cell; in the present example, it is the sum of N$_{GSM}$ and N$_{UMTS}$;

A$_{GSM}$: number of GSM radio channels after the current configuration; it is A$_{GSM}$=N$_{GSM}$±Δ, where Δ is equal to the number of radio channels that are currently being assigned/deactivated;

A$_{UMTS}$: number of UMTS radio channels after the current configuration; it is: A$_{UMTS}$=N$_{UMTS}$±Δ, where Δ is equal to the number of radio channels that are currently being assigned/deactivated;

RES$_{tot}$: maximum number of available radio channels for each cell for all the managed systems (i.e., in the considered example, for both the GSM and UMTS systems); this number depends on the complexity of the reconfigurable hardware used for implementing the base station; depending on N$_{GSM}$, N$_{UMTS}$, A$_{GSM}$ and A$_{UMTS}$ parameters, the following relationships are valid:

$$N_{GSM}+N_{UMTS}=N_{tot} \leq RES_{tot}$$

$$A_{GSM}+A_{UMTS}=N_{tot} \leq RES_{tot};$$

RES_FREQ$_{GSM}$: amount of hardware resources exploited by a GSM frequency;

RES_FREQ$_{UMTS}$: amount of hardware resources exploited by a UMTS frequency with one associated scrambling code;

RES_CODE$_{UMTS}$: amount of hardware resources exploited by one scrambling code in the UMTS system;

$k_{GSM}$: a memory constant; it is a weight used to calculate the time averages of the number of GSM radio channels to be assigned in the cell (0≤$k_{GSM}$≤1);

$k_{UMTS}$: a memory constant; it is a weight used to perform the time averages of the number of UMTS radio channels to be assigned in the cell (0≤$k_{UMTS}$≤1);

$\alpha_{THRESHOLD}$: a threshold, defined for example by the network operator, under which the α value, a quantity used in the procedure described in the following, is regarded as null;

$\beta_{THRESHOLD}$: a threshold, defined for example by the network operator, under which the β value, a quantity used in the procedure described in the following, is regarded as null;

T: monitoring period of the number of GSM and UMTS activities for each cell controlled by the radio controller 10;

R$_{GSM}$: a counter of the number of GSM terminals for each cell that experienced an activity (for example, that transmitted a Short Message Services—SMS—message or a Multimedia Message Services—MMS—message, or that received a call, or that placed a call) during the last monitoring period;

oldR$_{GSM}$: a counter of the number of GSM terminals for each cell that experienced an activity during the last-but-one monitoring period;

BlockThreshold$_{GSM}$: threshold of the percentage value of blocked GSM calls for each cell above which new radio channels can be added to the cell;

Blocked$_{GSM.max}$: percentage value of blocked GSM calls above which the cell performance, in terms of C/I, is calculated in simplified way (based on the re-use distance); this percentage value can be a unique value set for the whole network, or it can be set on a cell-by-cell basis;

REQ$_{GSM}$: number of requests made by GSM terminals for each cell in order to obtain access to the system for any reason (for example, for the transmission of SMS/MMS messages, for receiving a call, for performing a call) during the last monitoring period;

REJ$_{GSM}$: a counter of the number of blocked requests from GSM terminals for each cell due to lack of resources during the last monitoring period;

R$_{UMTS}$: a counter of the number of UMTS terminals for each cell that experienced an activity during the last monitoring period;

oldR$_{UMTS}$: a counter of the number of UMTS terminals for each cell that experienced an activity during the last-but-one monitoring period;

BlockThreshold$_{UMTS}$: threshold of the percentage value of blocked UMTS calls for each cell above which new radio channels can be added to the cell;

REQ$_{UMTS}$: a counter of the number of requests from UMTS terminals for each cell in order to obtain access to the system for any reason during the last monitoring period;

REJ_UL$_{UMTS}$: a counter of the number of rejected requests coming from UMTS terminals for each cell, blocked due to the exceeding of the acceptable interference limit in UpLink (UL), during the last monitoring period;

REJ_DL_code$_{UMTS}$: a counter of the number of rejected requests coming from UMTS terminals for each cell, blocked due to unavailability of scrambling codes in DownLink (DL), during the last monitoring period;

REJ_DL_pw$_{UMTS}$: a counter of the number of rejected requests coming from UMTS terminals for each cell blocked for insufficient transmission power in DL, during the last monitoring period;

REJ$_{UMTS}$: a counter of the number of rejected requests coming from UMTS terminals for each cell, blocked due to lack of resources, during the last monitoring period; it is $$REJ_{UMTS} = REJ\_UL_{UMTS} + REJ\_DL\_code_{UMTS} + REJ\_DL\_pw_{UMTS};$$

List$_{GSM}$: list of IMSI (International Mobile Subscriber Identity), or TMSI (Temporary Mobile Subscriber Identity), or TLLI (Temporary Link Layer Identifier) identifiers of GSM terminals that experienced activities (for example, transmission of SMS/MMS messages, received call, performed call) for each cell; every element in this list contains at least one set of the following fields: IMSI, TMSI, TLLI;

List$_{UMTS}$: list of IMSI (or TMSI or TLLI) identifiers of UMTS terminals that experienced activities (for example, transmission of SMS/MMS messages, received call, performed call) for each cell; every element in the list contains at least one set of the following fields: IMSI, TMSI, TLLI;

N$_{THR}$: minimum number of connections that allows the addition of one scrambling code to a UMTS frequency;

P$_{TX}^{connection}$: power per UMTS connection;

P$_{TX}^{max}$: maximum available radio-frequency power available in DL for each frequency of each cell;

$\eta_{max}$: maximum load factor in UL;

$\eta_{THR\%}$: minimum percentage threshold of increase of the load factor in UL; if the load factor can increase in percentage more that this threshold, then the activation of an additional scrambling code in respect of a frequency is justified, otherwise the introduced interference does not justify the removal of the cause of block;

$\Delta$cc: power margin for avoiding hysteresis and congestion control phenomena;

N_reconfig: a counter of the number of reconfiguration attempts in a time period T; it counts the necessaries reconfigurations of all the cells in a time period T;

T_THR_INCREASE: percentage threshold of N_reconfig for the cells of the considered area, set for example by the network operator, below which the algorithm decides to increase the time period T;

T_THR_DECREASE: percentage threshold of N_reconfig for the cells of the considered area, set for example by the network operator, above which the algorithm decides to decrease the time period T;

$\Delta$T_INCREASE: percentage of increase of the value of the time period T, set for example by the network operator;

$\Delta$T_DECREASE: percentage of decrease of the value of the time period T, set for example by the network operator;

UNDER_RECONFIG: a boolean flag whose value is TRUE until all the requests of reconfiguration are satisfied or rejected;

Every base station BS1, BS2, . . . , BSk keeps track of the current situation in each cell, for example, using the following data:

Calls$_{GSM}$: number of currently pending GSM calls; and
Calls$_{UMTS}$: number of currently pending UMTS calls.

It is pointed out that the number and the nature of the above-listed data are related to the described embodiment, and may vary in other embodiments of the invention.

A method according to an embodiment of the present invention will now be described in detail. It is pointed out that the individual method steps that will be presented may differ in alternative invention embodiments.

Initial Cell Status

The initial condition, namely the condition in which the procedure of the invention operates for the first time, is, for example, represented through the following data:

the frequencies included in the lists PlannedFreq$_{UMTS}$ and PlannedFreq$_{GSM}$ relate to the frequency planning performed, for example, by the network operator in the network planning phase;

for every cell, the lists ActiveFreq$_{GSM}$ and ActiveFreq$_{UMTS}$ may for example coincide with the lists PlannedFreq$_{GSM}$ and PlannedFreq$_{UMTS}$, respectively; alternatively, the lists ActiveFreq$_{GSM}$ and ActiveFreq$_{UMTS}$ may include each a single element, being the first element in the lists PlannedFreq$_{GSM}$ and PlannedFreq$_{UMTS}$, respectively;

for every cell, the list AvailableFreq$_{GSM}$ may contain all the inactive frequencies that are present in the respective list PlannedFreq$_{GSM}$, and all the inactive frequencies that are included in the similar lists PlannedFreq$_{GSM}$ of the neighboring cells;

for every cell, the list AvailableFreq$_{UMTS}$ may contain all the inactive frequencies that are included in the respective list PlannedFreq$_{UMTS}$, and the inactive frequencies that are included in the similar lists PlannedFreq$_{UMTS}$ of the neighboring cells;

for every cell, the number N$_{tot}$;

for the area under consideration, the list AreaActiveCode$_{UMTS}$ contains all the scrambling codes assigned to all the frequencies of all the cells handled by the considered radio controller (RNC);

for the area under consideration, the list AreaAvailableCode$_{UMTS}$ contains all the scrambling codes unused by the cells managed by the considered RNC;

for the area under consideration, the list AvailableFreqEX-T$_{GSM}$ contains the GSM frequencies made available from outside the network (e.g. by a spectrum broker) in a certain time interval; this list may be void;

for the area under consideration, the list AvailableFreqEX-T$_{UMTS}$ contains the UMTS frequencies made available from outside the network in a certain time interval; also this list may be empty;

all the other parameters not assigned by the network operator are for example initialized to a null value.

The inter-cell distance d and the average cell radius R of each cell of the area under consideration are calculated. For example, referring to FIG. 17, considering a cell A belonging to a certain site (the physical location where the antennas corresponding to one or more cells are installed), based on its azimuth values, the bisectors between the azimuth values of the cell are traced (a in FIG. 17), along with the azimuth values of the neighboring cells of the same site (azt1 ed azt2 in FIG. 17); within the sector thus identified, the sites included therein are determined, and the radius R=2d/3 is calculated, wherein d is the minimum inter-site distance between the site to which the considered cell A belongs and the closest site (B in FIG. 17) included in the sector defined by the bisectors.

Hereinafter, the example of a network will be considered in which two systems, namely a GSM system and a UMTS system co-exist.

First Macro-Step

Figure 3:
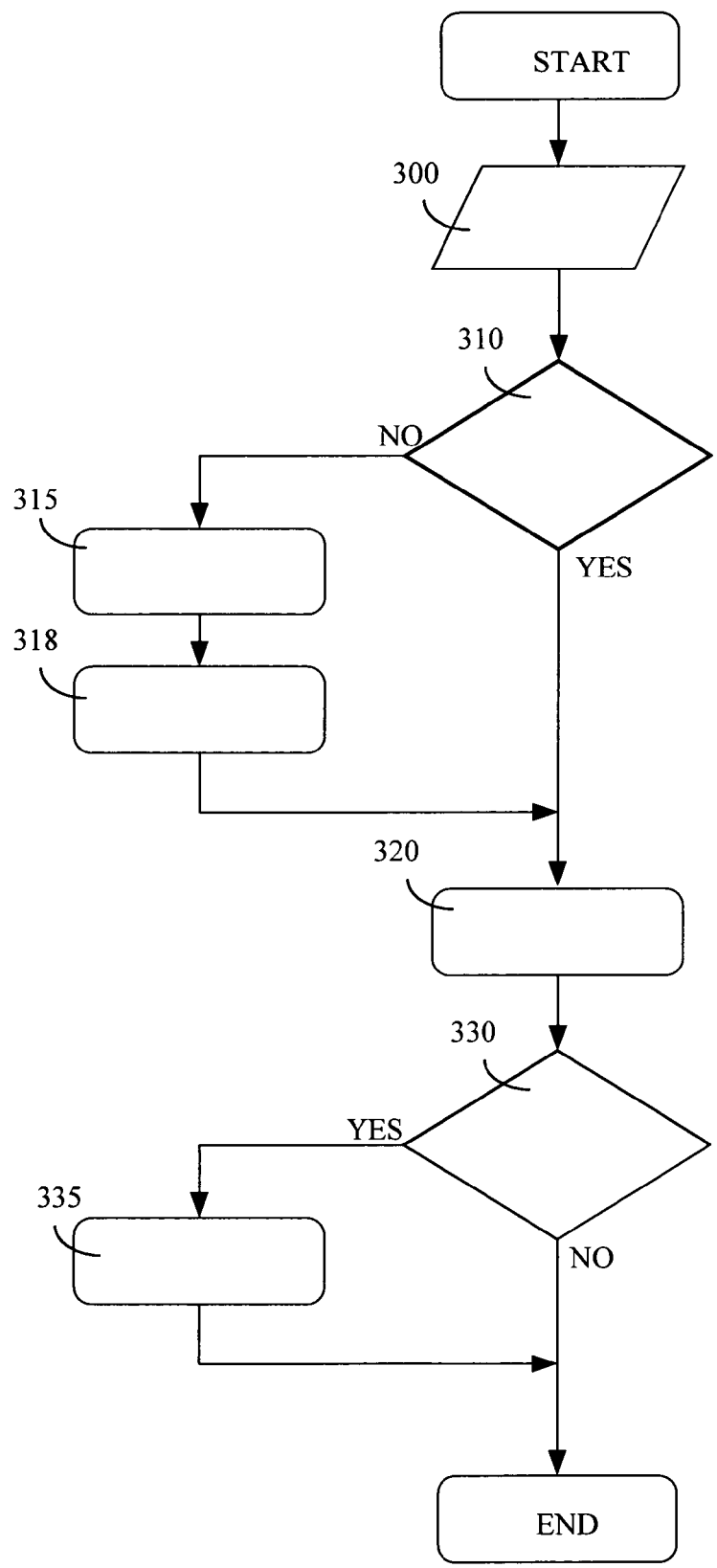
FIGS. 3 and 4 are flowcharts that show a monitoring procedure of a cells' activity status, respectively for the GSM and UMTS system, according to an embodiment of the present invention.

Referring to FIG. 3, in the first macro-step, for example, in case a GSM service request (e.g., a transmission/reception of SMS/MMS messages or a start—originating or terminating—of a call/connection) is detected (FIG. 3, step 300), the CM 14, for each cell managed by the radio controller 10, checks whether the identifier (TMSI or IMSI or TLLI) of the terminal that made the request is already present in the $List_{GSM}$ (step 310).

If the terminal identifier is not present in the list $List_{GSM}$ (step 310—NO), the CM 14 adds to the list $List_{GSM}$ the identifier (TMSI or IMSI or TLLI) of the terminal that made the request (step 315), and increases the counter $R_{GSM}$ (step 318), than the method proceeds to step 320. If the terminal identifier is already present in the list $List_{GSM}$ (step 310—YES), steps 315 and 318 are not performed, and the CM 14 proceeds directly to step 320.

At step 320, the counter $REQ_{GSM}$ is increased.

If the service request is not satisfied (i.e., it is blocked, rejected) (step 330—YES), the counter $REJ_{GSM}$ is increased (step 335), and the procedure ends; differently, if the service request is accepted (step 330—NO), step 335 is not performed, and the procedure ends.

Figure 4:
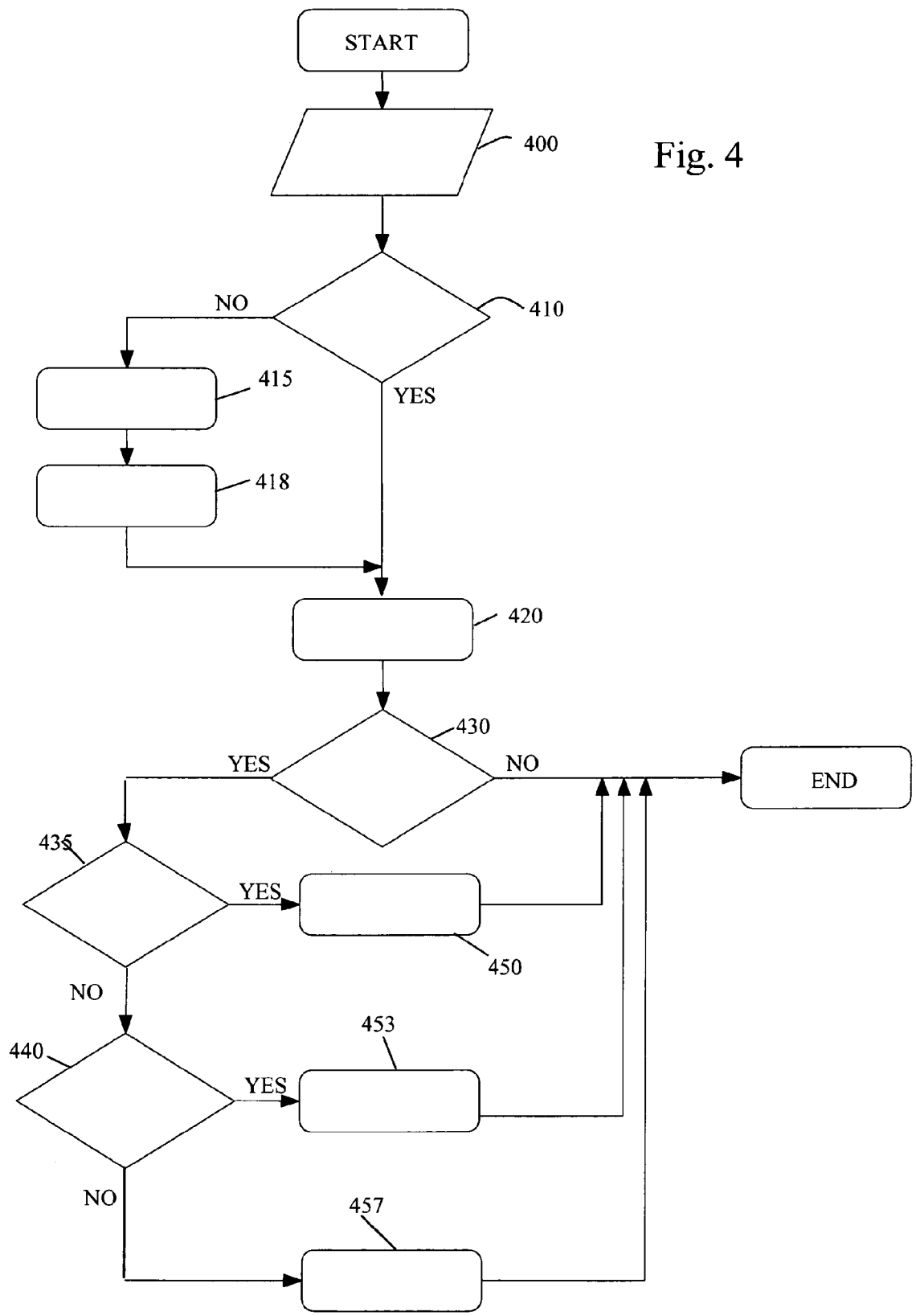

Similarly, in the first macro-step, for every detected UMTS service request (e.g., transmission/reception of an SMS or MMS messages, starting—originating or terminating—a call/connection), (FIG. 4, step 400) the CM 14, for each cell managed by the radio controller 10, checks whether the identifier (IMSI or TMSI or U-RNTI—UTRAN Radio Network Temporary Identity) of the terminal that made the request is already in the list $List_{UMTS}$ (step 410). If the identifier is not present in the list (step 410—NO), the CM 14 adds to the $List_{UMTS}$ the identifier (IMSI or TMSI or U-RNTI) of the terminal that made the request (step 415), then increases the counter $R_{UMTS}$ (step 418) and proceeds to step 420. If the identifier of the terminal that made the request is already in the list (step 410—YES), the CM 14 proceeds directly to step 420.

At step 420, the counter $REQ_{UMTS}$ is increased.

If the service request is satisfied (i.e., not blocked) (step 430—NO), the procedure ends.

If the service request is not satisfied (i.e. it is blocked, rejected) (step 430—YES), and if the cause of the block is in UL (step 435—YES), the counter $REJ\_UL_{UMTS}$ is increased (step 450), and the procedure ends. Otherwise, if the service request block is caused by unavailability of scrambling codes (step 440—YES), the counter $REJ\_DL\_code_{UMTS}$ is increased (step 453), and the procedure ends. If the cause of the service request block is not in UL, and the block is not caused by unavailability of scrambling codes (step 440—NO), the block of the service request is then due to insufficient power in DL; the counter $REJ\_DL\_pw_{UMTS}$ is increased (step 457) and the procedure ends.

Second Macro-Step

If the boolean flag UNDER_RECONFIG has value TRUE, the following operations are not performed in respect of all those cells that have not yet completed the reconfiguration procedure (cells under reconfiguration). The algorithm sets the flag UNDER_RECONFIG to TRUE because the reconfiguration phase is beginning, and resets to zero the counter N_reconfig.

Block Index Measure

Figure 5:
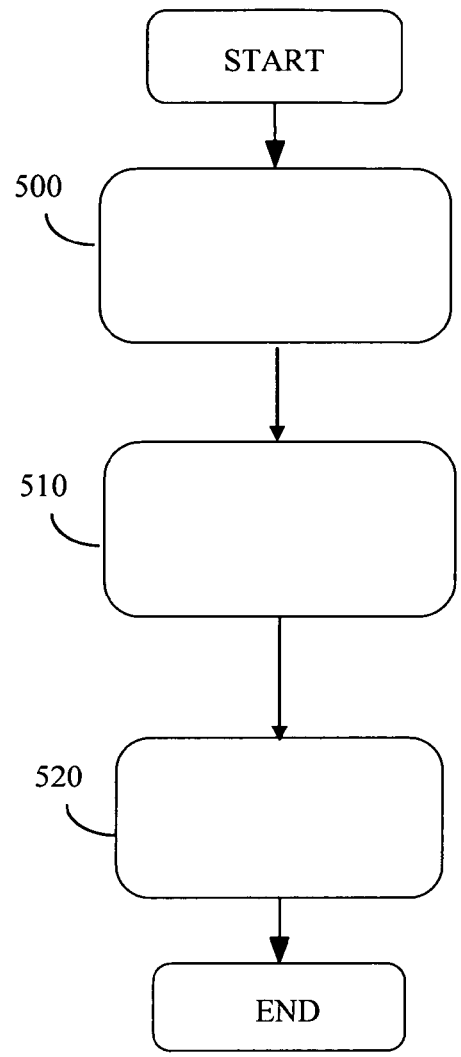
FIG. 5 shows a first step of a reconfiguration procedure according to an embodiment of the invention.

The second macro-step starts by measuring and storing the block probabilities for every cell managed by the radio controller 10; the measurement of the block probabilities is for example performed as follows (FIG. 5):

1. estimating the percentage of blocked GSM calls in the time interval T (step 500), being:

$$Blocked_{GSM} = \frac{REJ_{GSM}}{REQ_{GSM}};$$

2. estimating the percentage of blocked UMTS calls in the time interval T (step 510), being:

$$Blocked_{UMTS} = \frac{REJ_{UMTS}}{REQ_{UMTS}};$$

$$REJ_{UMTS} = REJ\_UL_{UMTS} + REJ\_DL\_code_{UMTS} + REJ\_DL\_pw_{UMTS};$$

(in other words, $REJ_{UMTS}$ is the sum of all the possible causes of block of a UMTS service request);

3. calculating the cell block index (step 520) as follows:

$$I_{BLOCKED} = Blocked_{GSM} + Blocked_{UMTS}$$

The block percentage estimations are obtained, in the present embodiment, by calculating the ratio between the number of unsatisfied requests and the total number of requests. However, such percentages, or possibly block probabilities related thereto, could be determined in other ways.

As far as the UMTS case is concerned, a discrimination is made of the rejected service requests based on the reason that lead to the service request rejection; for example, a UMTS service request may be rejected if the acceptance of the request would cause the interference in UL to become too high, or if there are no available scrambling codes in DL, or if the transmission power in DL is not sufficient to satisfy the request.

The block index is for example computed as the sum of such percentages, and its absolute value is, in this example, proportional to the possible cell block status. The block index may however be calculated in different ways.

The CM 14 uses the calculated block index to perform, for example, the sorting, in a decreasing block index order, of all the cells, so that the cells with higher block index/BLOCKED values are put in a priority position.

Cell Status Check

Figure 6:
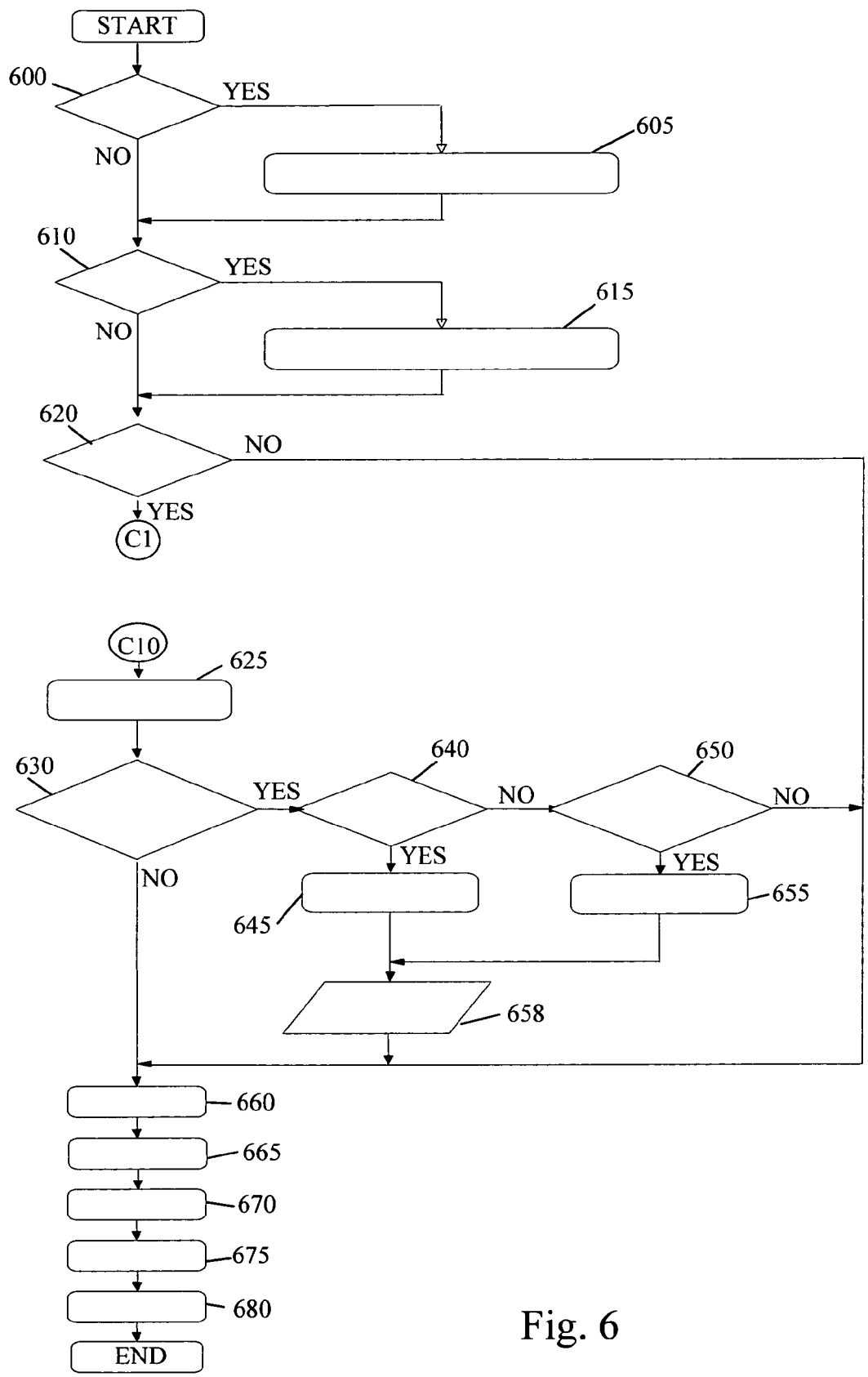
FIG. 6 shows a second step of the reconfiguration procedure according to an embodiment of the invention.
Figure 7:
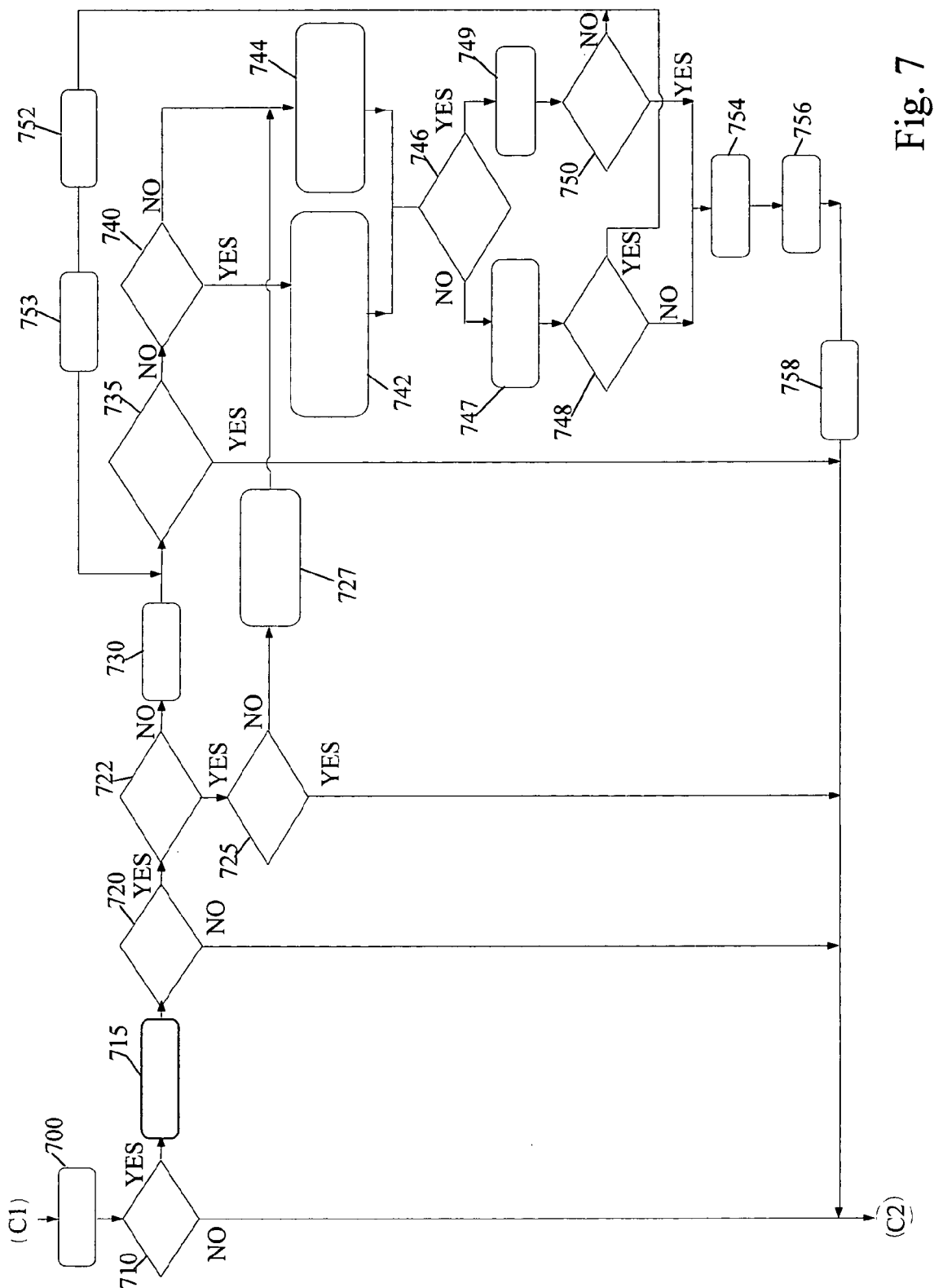
FIG. 7 shows a procedure according to an embodiment of the invention for identifying a radio resource to be added to a GSM base station.
Figure 8:
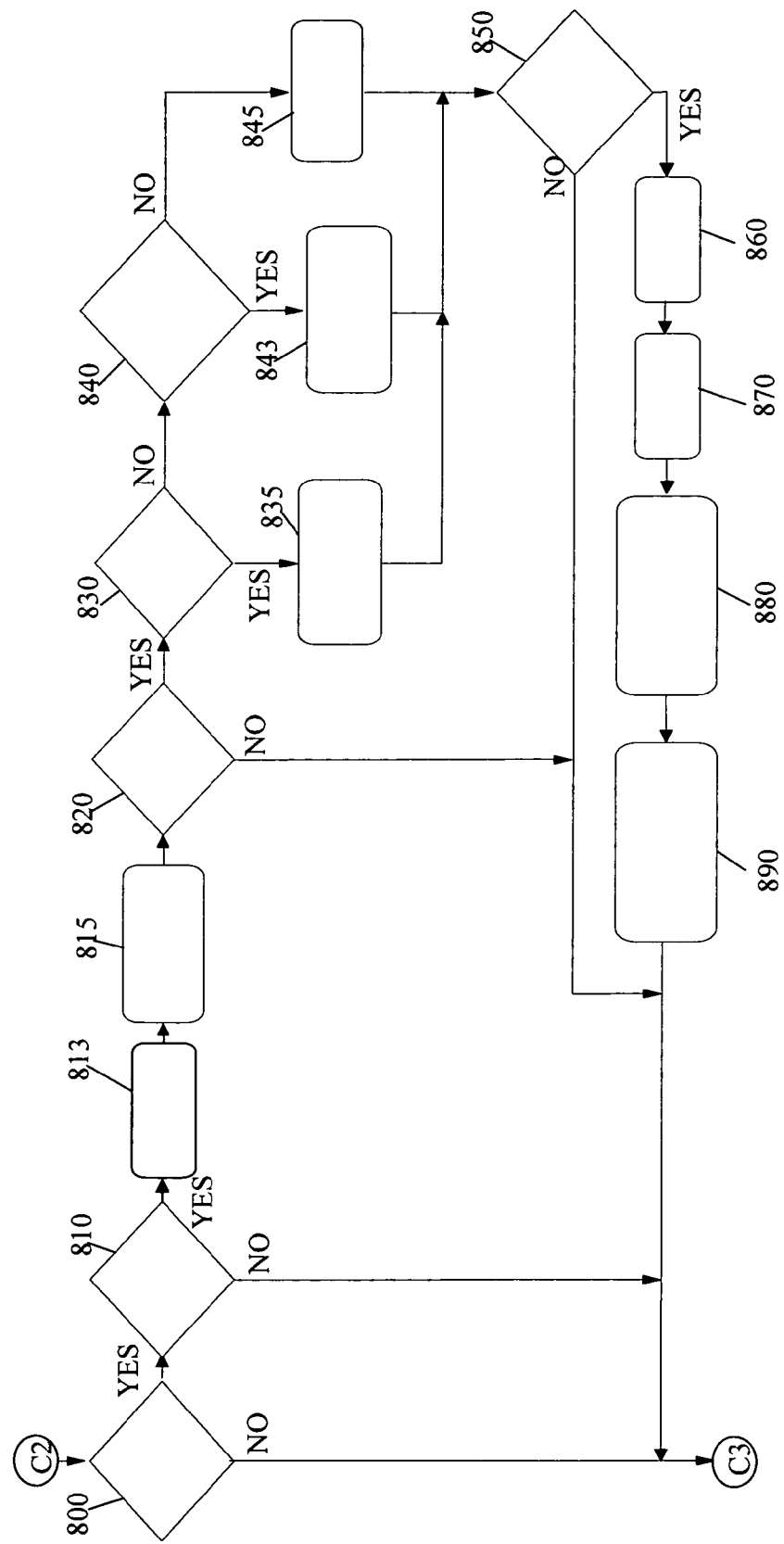
FIG. 8 shows a procedure according to an embodiment of the invention for identifying a radio resource to be eliminated from a GSM base station.

The CM 14, taking into account all the cells managed by the radio controller 10 according to their priority, performs the following steps (FIGS. 6, 7, 8).

If the number $R_{GSM}$ of GSM service requests is greater than 0 (step 600—YES), the CM 14 estimates the new percentage of GSM requests with the following formula (step 605):

$$\alpha = k_{GSM} \cdot \frac{N_{GSM}}{N_{GSM} + N_{UMTS}} + (1 - k_{GSM}) \cdot \frac{R_{GSM}}{R_{GSM} + R_{UMTS}};$$

otherwise (step 600—NO), step 605 is not performed and the CM 14 proceeds directly to step 610.

In step 610, the CM 14 checks if the number $R_{UMTS}$ of UMTS service requests is greater than 0; in the affirmative case (step 610—YES), the CM 14 estimates the new percentage of UMTS requests with the following formula (step 615):

$$\beta = k_{UMTS} \cdot \frac{N_{UMTS}}{N_{GSM} + N_{UMTS}} + (1 - k_{UMTS}) \cdot \frac{R_{UMTS}}{R_{GSM} + R_{UMTS}};$$

otherwise (step 610—NO), step 615 is not performed, and the CM 14 proceeds directly to step 620.

The above formulas provide, for each system (GSM and UMTS), a respective measure α, β, with values ranging between 0 and 1, of resources occupation and resources requests. Higher measure values correspond to greater request forecasts for each system, parameterized to the global occupation and request for the systems. It is intended that different formulas can be adopted for calculating the measures.

At step 620, the CM 14 assesses if $\alpha > \alpha_{THRESHOLD}$ or $\beta > \beta_{THRESHOLD}$ (i.e. if α is not to be regarded as null or β is not to be regarded as null). In the negative case (step 620—NO), the method proceeds to step 660, whereas in the affirmative case (step 620—YES), the status of the cells of the systems is checked (connector C1 and FIG. 7).

GSM Cell Status Check

With reference to FIG. 7, the local variable reconfig$_{GSM}$ is initialised to FALSE (step 700).

If Blocked$_{GSM}$>BlockedThreshold$_{GSM}$, i.e., if the percentage of blocked calls exceeds the threshold (step 710—YES), the counter N_reconfig (number of reconfiguration attempts) is increased (step 715).

If RES$_{tot}$-N$_{tot}$>RES_FREQ$_{GSM}$ (namely, if in the cell there are sufficient hardware resources for an additional frequency) (step 720—YES), and if the list AvailableFreq$_{GSM}$ is not empty (step 722—NO), a boolean value TRUE is assigned to the flag FlagFreqGSM$_i$ associated with each frequency i of the list AvailableFreq$_{GSM}$ (step 730). The flag FlagFreqGSM$_i$ is a boolean flag (that may take values TRUE or FALSE) which takes value FALSE if the considered frequency does not guarantee the desired level of quality of service, whereas it takes value TRUE otherwise. In case the flag FlagFreqGSM$_i$ takes value FALSE, the associated frequency is discarded by the resources reconfiguration process, because it is regarded as inadequate.

Let it be supposed that at least one frequency in the list AvailableFreq$_{GSM}$ has associated therewith a FlagFreqGSM$_i$=TRUE (step 735—NO).

If the active GSM carriers in the cell being present in the list ActiveFreq$_{GSM}$ are not all the planned carriers present in the list PlannedFreq$_{GSM}$ (step 740—YES), the first frequency with the flag FlagFreqGSM$_i$=TRUE present in the list AvailableFreq$_{GSM}$ and that is also present in the list PlannedFreq$_{GSM}$ but not present in the list ActiveFreq$_{GSM}$ is selected, and it is stored in the variable AddCarrier$_{GSM}$ (step 742).

Otherwise, if the active GSM carriers in the cell present in the list ActiveFreq$_{GSM}$ are all the planned carriers present in the list PlannedFreq$_{GSM}$ (step 740—NO), the first frequency with the flag FlagFreqGSM$_i$=TRUE present in the list of available frequencies AvailableFreq$_{GSM}$ but not present in the list ActiveFreq$_{GSM}$ is selected and stored in the variable AddCarrier$_{GSM}$ (step 744).

If (T≤T$_{min}$) or (Blocked$_{GSM}$≥Blocked$_{GSM.max}$), that is, if the time period T lasts less than a predetermined minimum value, or if the considered cell has a high block index (higher than a preset value Blocked$_{GSM.max}$) (step 746—YES), the re-use distance D$_{min}$ is estimated (step 749). It is observed that, in this case, since the monitoring period T is relatively short, or since the experienced block situation is serious and it should be overcome as soon as possible, it is preferable to reconfigure the cells quickly. The estimation of the re-use distance complies with the requirements of speed, compared to the estimation of the C/I levels made pixel-by-pixel and of the average C/I levels for all the cells of interest. The calculation of the re-use distance that allows to accept or discard a certain additional frequency is an approximation compared to the calculation of the C/I levels, but it is much faster, thereby allowing a reduction in the processing time. Based on geometric considerations, compared to an ideal situation of hexagonal cells, it can be obtained that R'=R/2, where R' denotes a corrected average cells' radius. As reported in the technical literature, $D_{min}=R'\sqrt{3G}$. The geometric factor G is estimated as the inverse ratio between the number of times the frequency i is used in the area managed by the radio controller and the number of cells included in such area:

$$G = \left(\frac{num(f_i\_per\_cell)}{num(cells)}\right)^{-1}.$$

Figure 17:
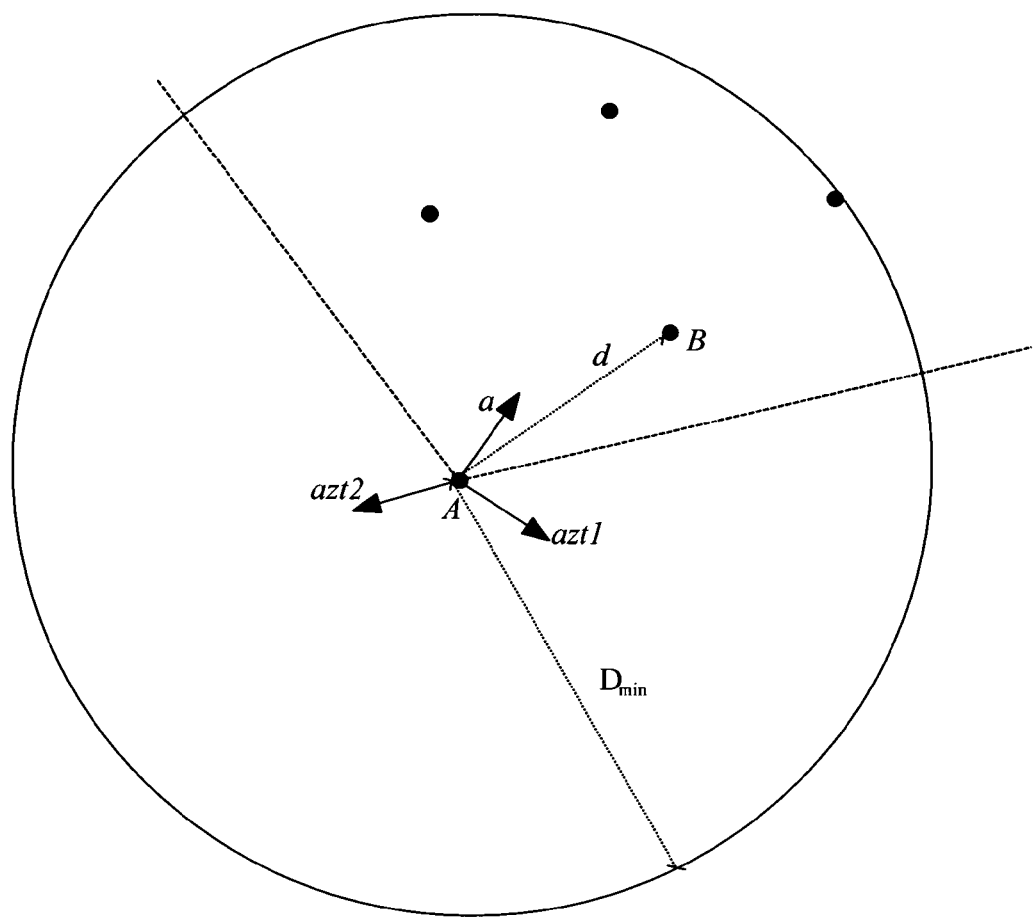
FIG. 17 pictorially shows how the re-use distance is calculated, in an embodiment of the present invention.

For example, let the area be considered defined by the intersection between the circle of radius D$_{min}$ centered on the site A of FIG. 17, to which the cell under consideration belongs, and the sector defined by the bisectors between the azimuth a-azt1 and a-azt2 of FIG. 17. If in said area no cells are found having the frequency AddCarrier$_{GSM}$ in the respective list ActiveFreq$_{GSM}$, then the re-use distance is verified (step 750—YES). In this case, there will be no frequency interference, thus the candidate frequency i selected from the list can be added to the frequencies already in use; the procedure proceeds to step 754.

Otherwise, if the re-use distance is not verified (step 750—NO), i.e. in said there is at least one cell having the frequency AddCarrier$_{GSM}$ in the respective list ActiveFreq$_{GSM}$, it is not possible to add the selected frequency i due to forecasted problems of interference based on geometric considerations, the flag FlagFreqGSM$_i$ for the frequency i is set to FALSE, and the candidate frequency i is discarded (step 752); the next frequency i+1 in the list AvailableFreq$_{GSM}$ is considered (step 753); the procedure returns to step 735.

If neither of the conditions (T≤T$_{min}$) or (Blocked$_{GSM}$≥Blocked$_{GSM.max}$) is verified (step 746—NO), for each cell belonging to the area of interest Area$_{int}$ the C/I is estimated (step 747) starting from the pixel-based C/I$_k$, where the index k spans the whole set of pixels (elementary areas) making up the best-server area of the considered cell. For example:

$$C/I_k = \frac{C_k}{\sum_m I_m + N}$$

where C$_k$ denotes the useful signal estimated in the k-th pixel, N is the thermal noise and I$_m$ are the isofrequential interfering signal components that reach the k-th pixel. The average C/I can, for example, be calculated as the percentile at the 90% of the individual C/I$_k$. The area of interest Area$_{int}$ can coincide with the whole area under consideration, and in such a case the calculation of the pixels' C/I could be made for all the cells (this however would involve long computation times, especially in case the area of interest is relatively wide), or the area of interest Area$_{int}$ might be a sub-area of the area under consideration, relatively close to the considered cell, i.e. the cell in respect of which an attempt is made of finding an additional frequency i (for example, the sub-area might be a ring of cells around the cell under examination).

Then, it is checked whether the calculated average C/I of one or more cells in the area of interest $Area_{int}$ is less than a minimum prescribed value $C/I_{THR}$, adapted to guarantee the service. For example, it is ascertained whether a cell j exists for which $C/I_i \le C/I_{THR}$. If one or more of such cell exists (step 748—YES), the method proceeds to step 752, and the frequency under consideration is discarded due to interference problems.

If instead all the average $C/I_i$ values are above the threshold $C/I_{THR}$, the method proceeds to step 754, and the frequency i is accepted as a candidate to the addition.

If the candidate frequency stored in the variable $AddCarrier_{GSM}$ is licensed to the network operator, it is removed from the lists $AvailableFreq_{GSM}$ of the current cell and of the neighboring cells thereto, otherwise the candidate frequency stored in the variable $AddCarrier_{GSM}$ is removed only from the list $AvailableFreq_{GSM}$ of the current cell (step 754).

The value $N_{tot}$ is increased proportionally to the increase in radio resources made available by the addition of the new carrier, i.e. of the amount $RES\_FREQ_{GSM}$ (step 756).

The variable $reconfig_{GSM}$ is set to TRUE, i.e. the CM 14 decides to reconfigure the GSM cell (step 758), and the method proceeds to step 800 (connector C2 and FIG. 8).

Back to step 722, if the list $AvailableFreq_{GSM}$ is void (step 722—YES), but the list $AvailableFreqEXT_{GSM}$ is not void, i.e. there are external frequencies available (step 725—NO), the first frequency in the list $AvaiablelFreqEXT_{GSM}$ is added to the list $AvailableFreq_{GSM}$ (step 727), and the method proceeds to step 744. If instead the list $AvailableFreqEXT_{GSM}$ is empty, the method proceeds to step 800.

If, in step 720, the condition $RES_{tot}-N_{tot}>RES\_FREQ_{GSM}$ is not met (step 720—YES), the method proceeds to step 800.

At step 800 (FIG. 8), it is checked if $Blocked_{GSM}=0$ (i.e., if the percentage of blocked GSM calls is zero). In the negative case, the methods proceeds directly to step 900 (connector C3 and FIG. 9). In the affirmative case (step 800—YES), if $oldR_{GSM}>R_{GSM}$ (i.e., if the number of GSM service requests is decreased in the last two time periods T) (step 810—YES) the number of reconfiguration attempts N_reconfig is increased (step 813). The radio controller instructs the cell under examination not to accept new service requests (step 815). If on the contrary the condition $oldR_{GSM}>R_{GSM}$ is not verified (step 810—NO), the method proceeds to step 900.

If the GSM carriers active in the cell included in the list $ActiveFreq_{GSM}$ are at least 2 (step 820—YES) (in the exemplary invention embodiment considered herein the complete switch off of a cell, i.e. the deactivation of all the frequencies active in said cell, is not contemplated), and if in the list $ActiveFreq_{GSM}$ there is at least one external frequency (for example, a frequency leased by a spectrum broker), then the external frequency is selected for the deactivation (in other words, the radio resources that are released first are preferably those that are not licensed to the network operator, being leased from other licensed operators) (step 830—YES); the first external frequency in the list of available frequencies $ActiveFreq_{GSM}$ is selected and stored in the variable $DropCarrier_{GSM}$ (step 835), and the method proceeds to step 850.

If none of the active frequencies in the list $ActiveFreq_{GSM}$ is external (step 830—NO), and if the active GSM carriers of the cell included in the list $ActiveFreq_{GSM}$ are not all the carriers planned listed in the list $PlannedFreq_{GSM}$ (step 840—NO), the first frequency included in the available frequencies list $ActiveFreq_{GSM}$ and not included in the list $PlannedFreq_{GSM}$ is selected and stored in the variable $DropCarrier_{GSM}$ (step 845), and the method proceeds to step 850.

If instead the active GSM carriers of the cell included in the list $ActiveFreq_{GSM}$ are all the carriers planned listed in the list $PlannedFreq_{GSM}$ (step 840—NO), the first frequency included in the available frequencies list $ActiveFreq_{GSM}$ is selected and stored in the variable $DropCarrier_{GSM}$ (step 843), and the method proceeds with step 850.

At step 850 it is ascertained if the existing calls on the frequency that will be deactivated can be served by the other radio resources. In the affirmative vase (step 850—YES), the value $N_{tot}$ is decreased of the amount $RES\_FREQ_{GSM}$, proportional to the amount of radio resources lost by suppressing one carrier (step 860). The variable $reconfig_{GSM}$ is set to TRUE, i.e., the CM 14 decides to reconfigure the GSM cell (step 870). By invoking a handover procedure, the active calls on the radio resource being suppressed are deviated towards the other available radio resources. Before proceeding, handover acknowledgments are waited for. In case of failure of a handover, the call or calls are terminated (step 880). The radio controller 10 instructs to accept any new service request, avoiding to assign them to the radio resource being suppressed (step 890). The method then proceeds to step 900.

If the existing calls on the frequency that will be deactivated cannot be served by the other radio resources (step 850—NO), the radio resource cannot be suppressed, and the method proceeds to step 900.

Back to step 820, if only one carrier is present in the considered cell (step 820—NO), the method proceeds to step 900; no radio resources are suppressed (as mentioned above, the complete switching off of sites is not contemplate in this exemplary embodiment.

UMTS Cell Status Check

In respect of the cells of the UMTS system, the check of the cells' status comprises for example the following operations, schematized in the flowcharts of FIGS. 9-12.

The local variable $reconfig_{UMTS}$ is intialised to FALSE (step 900).

If $Blocked_{UMTS}>BlockedThreshold_{UMTS}$ (that is, if the percentage of blocked calls exceeds the threshold) (step 910—YES), the counter N_reconfig of the number of reconfiguration attempts is increased (step 915), then it is assessed whether the cause of the block is an insufficient power in UL or in DL. In the affirmative case (step 920—YES), if $RES_{tot}-N_{tot} \ge RES\_FREQ_{UMTS}$ (i.e., if the cell hardware configuration leaves available resources for managing an additional carrier with associated scrambling code) (step 930—YES), and if the list $AvailableFreq_{UMTS}$ is not empty (step 940—NO), and if the active UMTS carriers of the cell listed in the list $ActiveFreq_{UMTS}$ are not all the planned carriers listed in the list $PlannedFreq_{UMTS}$ (step 950—YES), the first frequency included in the list $AvailableFreq_{UMTS}$ that is also present in the list $PlannedFreq_{UMTS}$ but not present in the list $ActiveFreq_{UMTS}$, is selected and stored in the variable $AddCarrier_{UMTS}$ (step 953); the method then proceeds to step 960.

Otherwise (step 950—NO), if the active UMTS carriers in the cell included in the list $ActiveFreq_{UMTS}$ are all the planned carriers listed in the list $PlannedFreq_{UMTS}$, the first frequency included in the list of available frequencies $AvailableFreq_{UMTS}$ and not present in the list $ActiveFreq_{UMTS}$, is selected and stored it in the variable $AddCarrier_{UMTS}$ (step 955); the method then proceeds to step 960.

At step 960, the selected frequency $AddCarrier_{UMTS}$ is deleted from the list $AvailableFreq_{UMTS}$ of the current cell. the value $N_{tot}$ is then increased proportionally to the hardware resources occupation $RES\_FREQ_{UMTS}$ of the new carrier (step 965).

An available scrambling code to associate to the carrier is then searched (step 967), as described later on.

Then, the variable reconfig$_{UMTS}$ is set to TRUE, i.e. the CM 14 decides to reconfigure the UMTS cell (step 970). The method proceeds to step 1200 (connector C4 and FIG. 12)

If the list AvailableFreq$_{UMTS}$ is empty (step 940—YES), but the list AvailableFreqEXT$_{UMTS}$ of external frequencies is not empty (step 945—NO), the first frequency of the list AvailableFreqEXT$_{UMTS}$ is added to the list AvailableFreq$_{UMTS}$ (step 947), and the method proceeds with step 955. If there are no external frequencies available, or the list of available frequencies is empty (step 945—YES), the method proceeds to step 1200 (connector C4 and FIG. 12).

If there are insufficient hardware resources available (step 930—NO), the method proceeds directly to step 1200.

Figure 10:
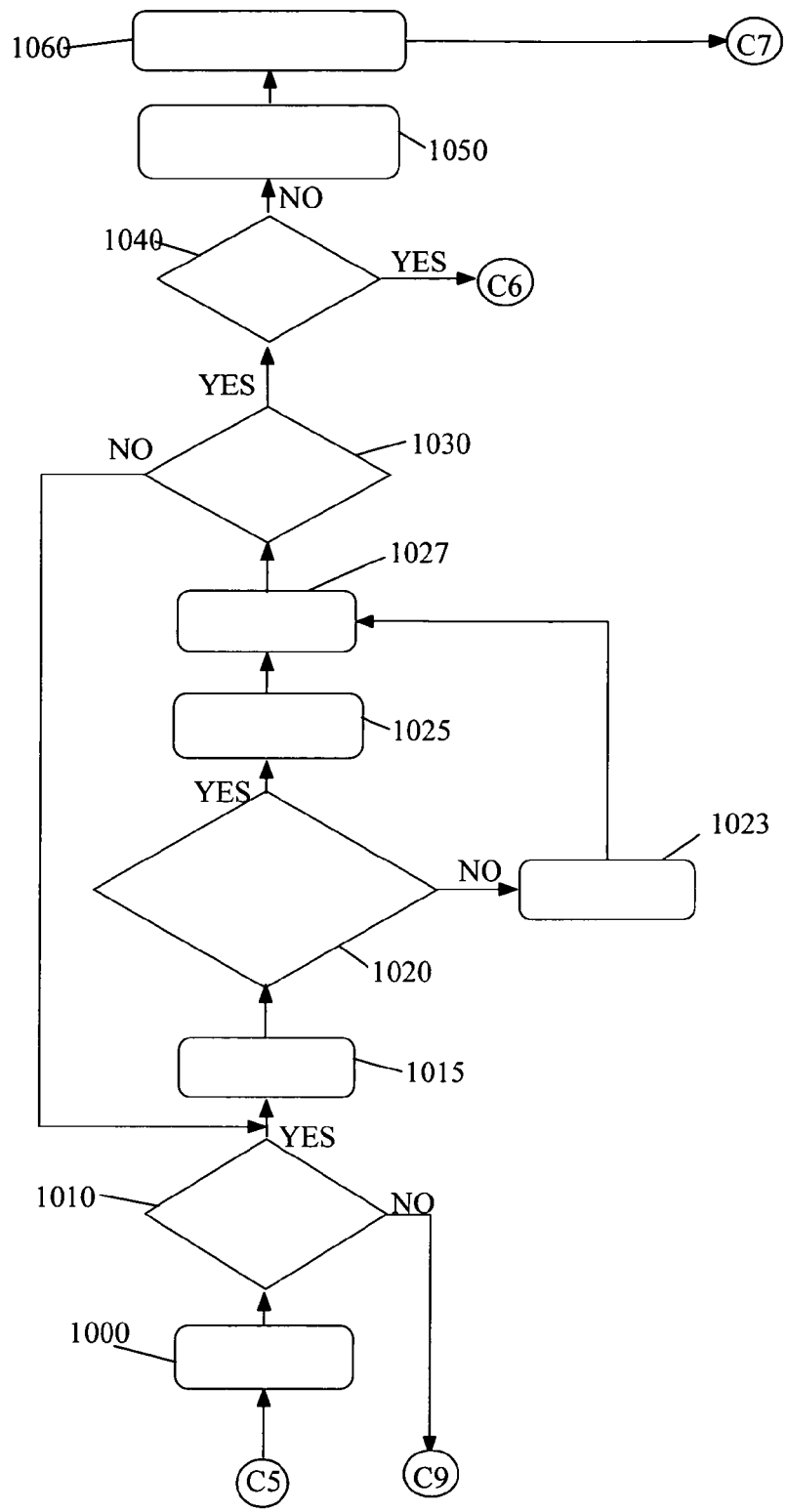

If the main cause of the block is the unavailability of scrambling codes (step 920—NO), the method proceeds to step 1000 (connector C5 and FIG. 10). For all the frequencies k=N_freq_cell, where N_freq_cell is the number of active frequencies for each cell, the flag FlagFreqUMTS$_k$ is set to TRUE (step 1000); the flag FlagFreqUMTS$_k$ is the boolean flag (taking value TRUE or FALSE) associated with each frequency active in a generic cell. The flag FlagFreqUMTS$_k$ takes value FALSE if, for the associated frequency, it cannot be guaranteed that it is possible to add a scrambling code, and it takes value TRUE in the opposite case. If the flag FlagFreqUMTS$_k$ takes value FALSE, no additional scrambling code can be associated to the corresponding frequency, and that frequency is discarded.

If there are sufficient free hardware resources for adding a scrambling code, i.e. if RES$_{tot}$−N$_{tot}$≥RES_CODE$_{UMTS}$ (step 1010—YES), the frequency ActiveFreq$_{UMTS}$[k] having FlagFreqUMTS$_k$=TRUE is selected (step 1015).

The addition of a scrambling code to the frequency k shall comply with requirements on the power in DL and the load factor in UL; for example, the requirements to be met are the following.

A first condition is that the overall power $P_{TX}^{max}$ is spread across all the scrambling codes associated with the selected frequency; thus, it is necessary that, after adding the new scrambling code, the power that remains available for transmitting with the already active codes is sufficient to handle the calls already active in the cell, and that by adding the new scrambling code it is actually possible to handle an increased number of service requests, higher of a factor N$_{THR}$ compared to the number of service requests that can be handled with the already active scrambling codes; the factor N$_{THR}$ can be set by the network manager; in other words, $P_{SC}^{add}=P_{TX}^{max}-P_{SC}^{existing}-\Delta cc$, where $P_{SC}^{add}$ is the transmission power reserved to the new scrambling code, $P_{SC}^{existing}$ is the transmission power reserved to the already active scrambling codes, and $\Delta cc=P_{tx}^{max}(1-P_{cc})$, being $P_{cc}$ the congestion control threshold in the area considered, expressed as a percentage of the maximum power. The following condition shall be met: $P_{SC}^{add}>N_{THR} \cdot P_{TX}^{connection}$, that is, addition of a new scrambling code to that frequency allows managing an increased number of service requests (at least one more, when N$_{THR}$=1);

Another condition to be met is that the load factor η(k) of the k-th frequency in UL shall not be higher than the maximum load factor η$_{max}$, and the addition of the new scrambling code to the frequency k shall ensure that the overall load factor increases at least of a percentage η$_{THR\%}$, that can be set by the network manager. These requirements are for example met by checking that:

$$\frac{\Delta\eta_{pot}}{\eta_{actual}} > \eta_{THR\%},$$

where $\Delta\eta_{pot}=\eta_{max}-\eta_{actual}$.

If both the above conditions are met (step 1020—YES), the values $P_{SC}^{add}(k)$ and η(k) in respect of the k-th frequency are stored (step 1025); the index k is decreased for cycling over all the frequencies k of the cell (step 1027); until the index k is zero (step 1030—NO), the method loops back to step 1015.

Figure 9:
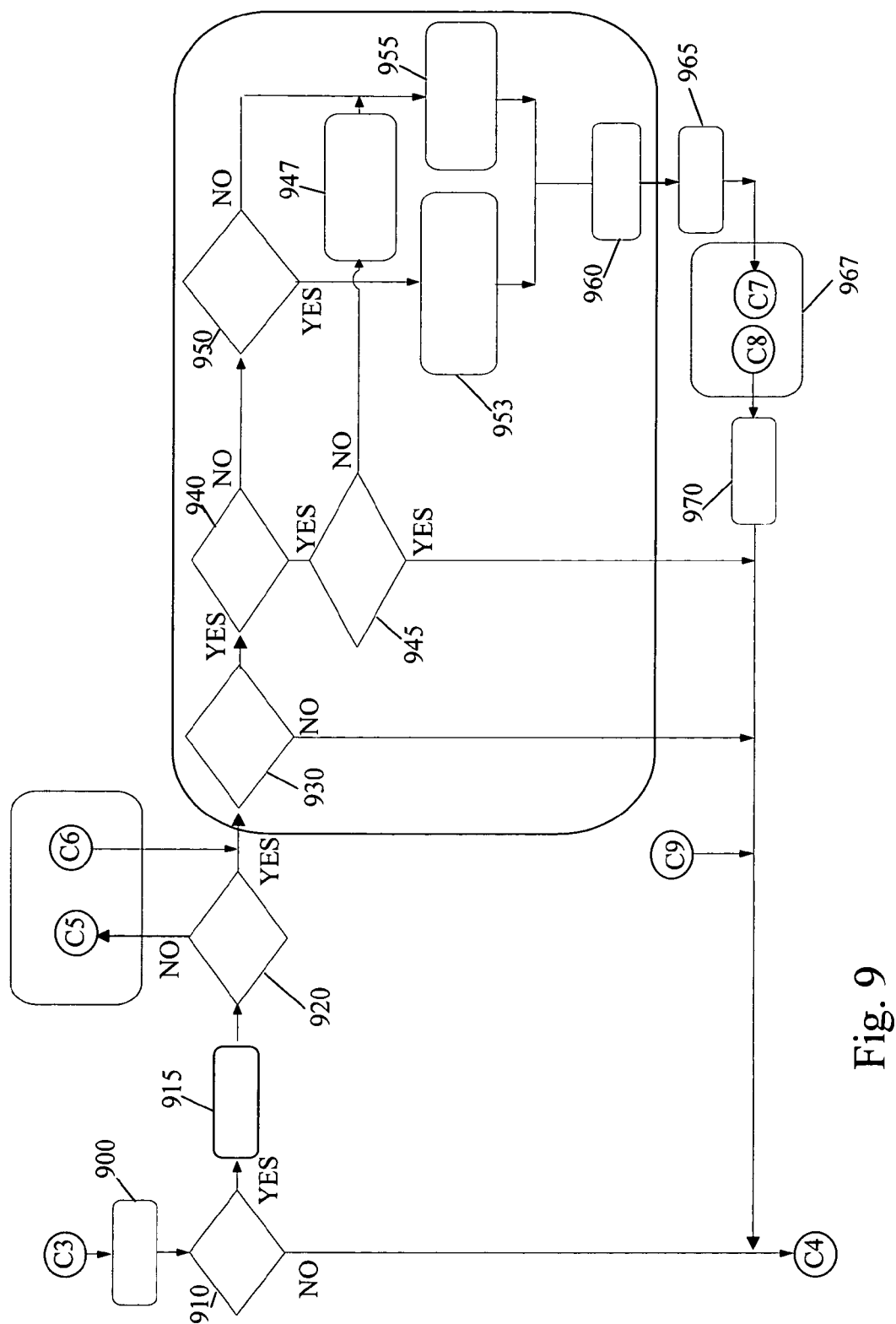
FIGS. 9, 10 and 11 show a procedure according to an embodiment of the invention for identifying a radio resource to be added to a UMTS base station.

Once the index k has reached the zero (step 1030—YES), if the flag FlagFreqUMTS$_k$=FALSE for all the frequencies N_freq_cell of the cell (step 1040—YES), in order to solve capacitance problems the addition of a new frequency is attempted, and the method proceeds to step 930 (connector C6 and FIG. 9). Otherwise it means that at least one frequency has been found that satisfies the conditions of step 1020 and that it is possible to add a scrambling codes tree to that frequency (step 1040—NO).

The frequencies and the corresponding power values $P_{SC}^{add}(k)$ and load factor values η(k) stored are sorted by increasing load factor and decreasing power, assigning priority, in the sorted list, to the frequencies licensed to the network operator compared to the external frequencies; in this way, the frequencies licensed to the network operator are privileged, so as to keep the external frequencies as unloaded as possible (the external frequencies are preferably released as soon as the traffic conditions so allow, for example when the service requests decrease) (step 1050);

The first frequency in the sorted list (the one having the lowest load factor η(k) and the highest power $P_{SC}^{add}(k)$) is selected (step 1060), and the method proceeds to step 1100 (connector C7 and FIG. 11), for searching the scrambling code to be assigned to the frequency k. Afterwards, the variable reconfig$_{UMTS}$ is set to TRUE (i.e., the CM 14 decides to reconfigure the UMTS cell) (step 970) and the method proceeds to step 1200.

If the two conditions set forth above are not verified, i.e. there is no sufficient power for adding a new scrambling code to the k-th frequency, and/or it is not possible to increase the load factor of the percentage η$_{THR\%}$ by adding a new scrambling code to the frequency k (step 1020—NO), the flag FlagFreqUMTS$_k$ is set to FALSE (step 1023), and the method proceeds to step 1027: the considered frequency is discarded from the set of the candidate frequencies to which a scrambling code can be added, and the index k is decreased.

If the hardware resources are not sufficient for adding a new scrambling code (step 1010—NO), they will also be insufficient for the addition of a new carrier; the method then proceeds to step 1200 (connector C9 and FIG. 9).

If Blocked$_{UMTS}$<BlockedThreshold$_{UMTS}$ (i.e., if the percentage of blocked calls does not exceed the threshold) (step 910—NO), the method proceeds directly to step 1200.

At step 1200 it is assessed whether Blocked$_{UMTS}$=0 (i.e., whether the percentage of blocked UMTS calls is zero); in the affirmative case (step 1200—YES), if oldR$_{UMTS}$>R$_{UMTS}$ (i.e., if the number of UMTS service requests has decreased in the last two time periods 1") (step 1210—YES), the counter N_reconfig is increased (step 1211). The radio controller 10 instructs not to accept new service requests (step 1213). For the considered cell, all the metrics M(i,j) associated with the pairs frequency-scrambling codes (f$_i$, PSC$_j$) are calculated, for each i and for each j associated with I (step 1217). Such metrics measure the equivalent occupation of a scrambling codes tree associated with a scrambling code; the higher the metric value, the more occupied the tree.

If the set of the calculated metrics allows removing a tree associated with a scrambling code (step 1220—YES), for example if $$\sum_i \sum_j M(i, j) < N_{alberi} - 1,$$

and there is at least one external frequency (step 1230—YES), the tree associated with the first external frequency and having the smallest metric is assigned to the variable DropCode$_{UMTS}$. In this way the release of the external frequency is favoured (step 1233). If all the frequencies of the cell are licensed frequencies of the network operator (step 1230—NO), the tree having the smallest metric M(i,j) is assigned to the variable DropCode$_{UMTS}$ (step 1237).

The number of trees is decreased: $N_{trees}=N_{trees}-1$ (step 1240).

The counter $N_{tot}$ is decreased of RES_CODE$_{UMTS}$, i.e. the hardware resources associated with a new scrambling code are subtracted from the overall available hardware resources (step 1245).

If the scrambling code stored in the variable DropCode$_{UMTS}$ is the only one associated with the considered frequency (step 1250—YES), the frequency to which that scrambling code is associated is eliminated. The frequency to be eliminated is stored in the variable DropCarrier$_{UMTS}$ (step 1253). The counter $N_{tot}$ is decreased of (RES_FREQ$_{UMTS}$−RES_CODE$_{UMTS}$) (step 1255). It is assumed that RES_FREQ$_{UMTS}$ contains RES_CODE$_{UMTS}$. The method proceeds to step 1257.

If there are other scrambling codes associated with that frequency, the flag reconfig$_{UMTS}$ is set to TRUE (step 1257) (i.e., the CM 14 decides to reconfigure the UMTS cell).

The handover of the active calls is requested from the radio resource being eliminated towards the remaining radio resources. Before proceeding, the acknowledge of the handovers is waited for; if one handover fails, the call is terminated.

The radio controller instructs to accept new service requests but not to allocate them on the radio resource being eliminated.

If the set of calculated metrics does not allow to eliminate a scrambling code from the considered frequency (step 1220—NO), the method proceeds to step 625 (connector C10 and FIG. 6).

If the service requests have not decreased in the last two time periods T (step 1210—NO), the method proceeds to step 625.

If the percentage of blocked calls is not zero (step 1200—NO) the method proceeds to step 625.

Searching the Scrambling Code to be Assigned to a Frequency

Figure 11:
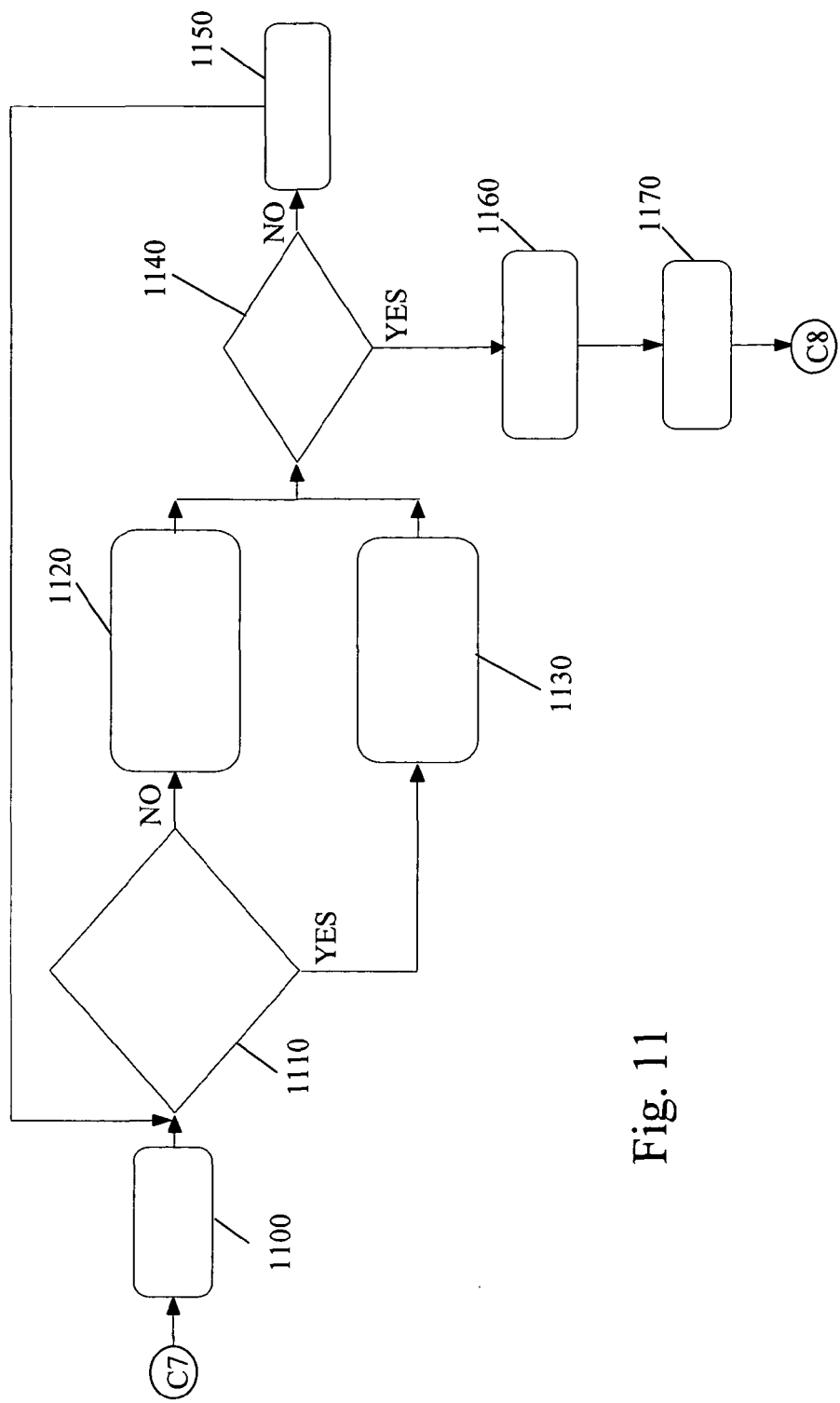
Figure 12:
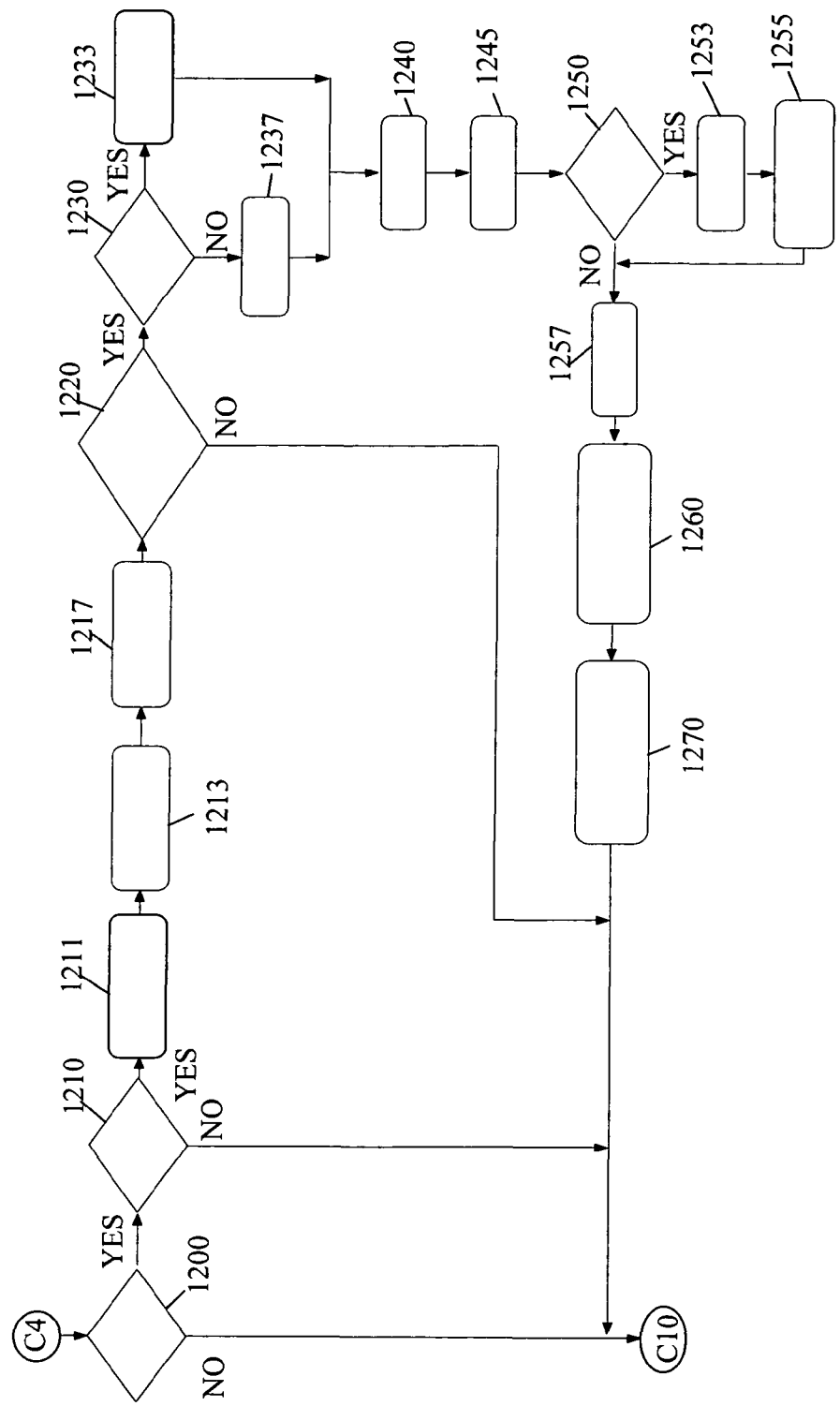
FIG. 12 shows a procedure according to an embodiment of the invention for identifying a radio resource to be eliminated from a UMTS base station.

Referring to FIG. 11, for all the scrambling codes i available and active in the area being considered, the flag FlagCodei is set to TRUE (step 1100). The flag FlagCodei may take a boolean value (TRUE o FALSE) associated with each active or available scrambling code in each area being considered. The flag FlagCodei is used when deactivating a new scrambling code to discriminate, in the lists of available or active codes, those compatible with the network context (e.g., scrambling codes not used in neighboring cells). The value initially set to TRUE is changed into FALSE if that scrambling code is not compatible with the network context, and as a consequence it cannot be activated for the frequency being considered (for example because that scrambling code is already active in the cells neighbor to that being examined).

If the list AreaAvailableCode$_{UMTS}$ is not empty (step 1110—NO) or there is at least one scrambling code i in the list for which FlagCode$_i \neq$FALSE, i.e. if there are available scrambling codes in the area to which the cell being examined belongs, and if the available scrambling codes have not been discarded as being incompatible with the network context, the method assigns to the variable AddCode$_{UMTS}$ the first scrambling code in the list AreaAvailableCode$_{UMTS}$ not present in the list AreaActiveCode$_{UMTS}$ and having the flag FlagCode$_i$=TRUE (step 1120) then proceeds to step 1140.

If instead the list AreaAvailableCode$_{UMTS}$ is empty, or for each scrambling code i of the list it is FlagCode$_i$=FALSE (step 1110—YES), the method assigns to the variable AddCode$_{UMTS}$ the first scrambling code of the list AreaActiveCode$_{UMTS}$ having the flag FlagCode$_i$=TRUE (step 1130) and proceeds to step 1140.

If the scrambling code stored in the variable AddCode$_{UMTS}$ is compatible with the network context in which the cell being examined is located (for example, it is not present in the cells neighboring thereto) (step 1140—YES), the code stored in the variable AddCode$_{UMTS}$ is removed from the list AreaAvailableCode$_{UMTS}$ (step 1160), and the counter $N_{tot}$ is increased by RES_CODE$_{UMTS}$, i.e. the overall value of the exploited hardware resources is increased of an amount corresponding to the addition of a scrambling code (step 1170); the method then proceeds to step 970 (connector C8).

If differently the scrambling code stored in the variable AddCode$_{UMTS}$ is not compatible with the network context, the flag FlagCode$_i$ is set to FALSE (step 1150), and the method returns to step 1110 and tries another scrambling code.

Dynamic Cells Configuration

Making again reference to FIG. 6, in step 625 the flags FlagFreq$_{GSMi}$ and FlagFreq$_{UMTSi}$ are set to TRUE, for all the values of the index i.

If the flag reconfig$_{GSM}$ is equal to TRUE or the flag reconfig$_{UMTS}$ is equal to TRUE (i.e., if the CM 14 decided to reconfigure the GSM cell or UMTS cell) (step 630—YES), and if $\alpha \geq \beta$ and reconfig$_{GSM}$ is equal to TRUE (step 640—YES), A$_{GSM}$ is set equal to a $N_{tot}$ and A$_{UMTS}$ is set equal to $(1-\alpha)N_{tot}$ (in this way, the majority of the resources is assigned to the GSM if $\alpha$ is greater than or equal to $\beta$) (step 645).

The CM 14 sends to the base station that manages the cell the CELL RECONFIGURATION COMMAND reconfiguration message (step 658) with the following fields:
  Cell identifier;
  Number of GSM resources to be configured: A$_{GSM}$;
  Number of UMTS resources to be configured: A$_{UMTS}$;
  List of GSM carriers to be configured in the cell: ActiveFreq$_{GSM}$ to which AddCarrier$_{GSM}$ (if present) is added and from which DropCarrier$_{GSM}$ (if present) is removed;
  List of UMTS carriers to be configured in the cell: ActiveFreq$_{UMTS}$ to which AddCarrier$_{UMTS}$ (if present) is added and from which DropCarrier$_{UMTS}$ (if present) is removed;
  Scrambling code AddCoder$_{UMTS}$ to be added to one or more frequencies of the cell.

If the conditions in step 640 are not verified (step 640—NO), and if the flag reconfig$_{UMTS}$ is equal to TRUE (step 650—YES), A$_{UMTS}$ is set equal to $\beta N_{tot}$ and A$_{GSM}$ is set equal to $(1-\beta)N_{tot}$ (i.e., the majority of the resources are assigned to the UMTS if $\beta$ is greater than $\alpha$) (step 655).

The CM 14 sends to the base station that manages the cell the CELL RECONFIGURATION COMMAND reconfiguration message (step 658) with the following fields:

Cell identifier;
Number of GSM resources to be configured: $A_{GSM}$;
Number of UMTS resources to be configured: $A_{UMTS}$;
List of GSM carriers to be configured in the cell: ActiveFreq$_{GSM}$ to which AddCarrier$_{GSM}$ (if present) is added and from which DropCarrier$_{GSM}$ (if present) is removed;
List of UMTS carriers to be configured in the cell: ActiveFreq$_{UMTS}$ to which AddCarrier$_{UMTS}$ (if present) is added and from which DropCarrier$_{UMTS}$ (if present) is removed;
Scrambling code AddCoder$_{UMTS}$ to be added to one or more frequencies of the cell.

If the flag reconfig$_{UMTS}$ is not equal to TRUE (step 650—NO), the method proceeds to step 660: oldR$_{GSM}$ is set equal to R$_{GSM}$ and oldR$_{UMTS}$ is set equal to R$_{UMTS}$ (step 660), then the lists List$_{GSM}$ and List$_{UMTS}$ are emptied (step 665); the counters R$_{GSM}$ and R$_{UMTS}$ are reset (step 670); the counters REQ$_{GSM}$ and REJ$_{GSM}$ are reset (step 675); the counters REQ$_{UMTS}$ and REJ$_{UMTS}$ are reset (step 680).

Figure 13:
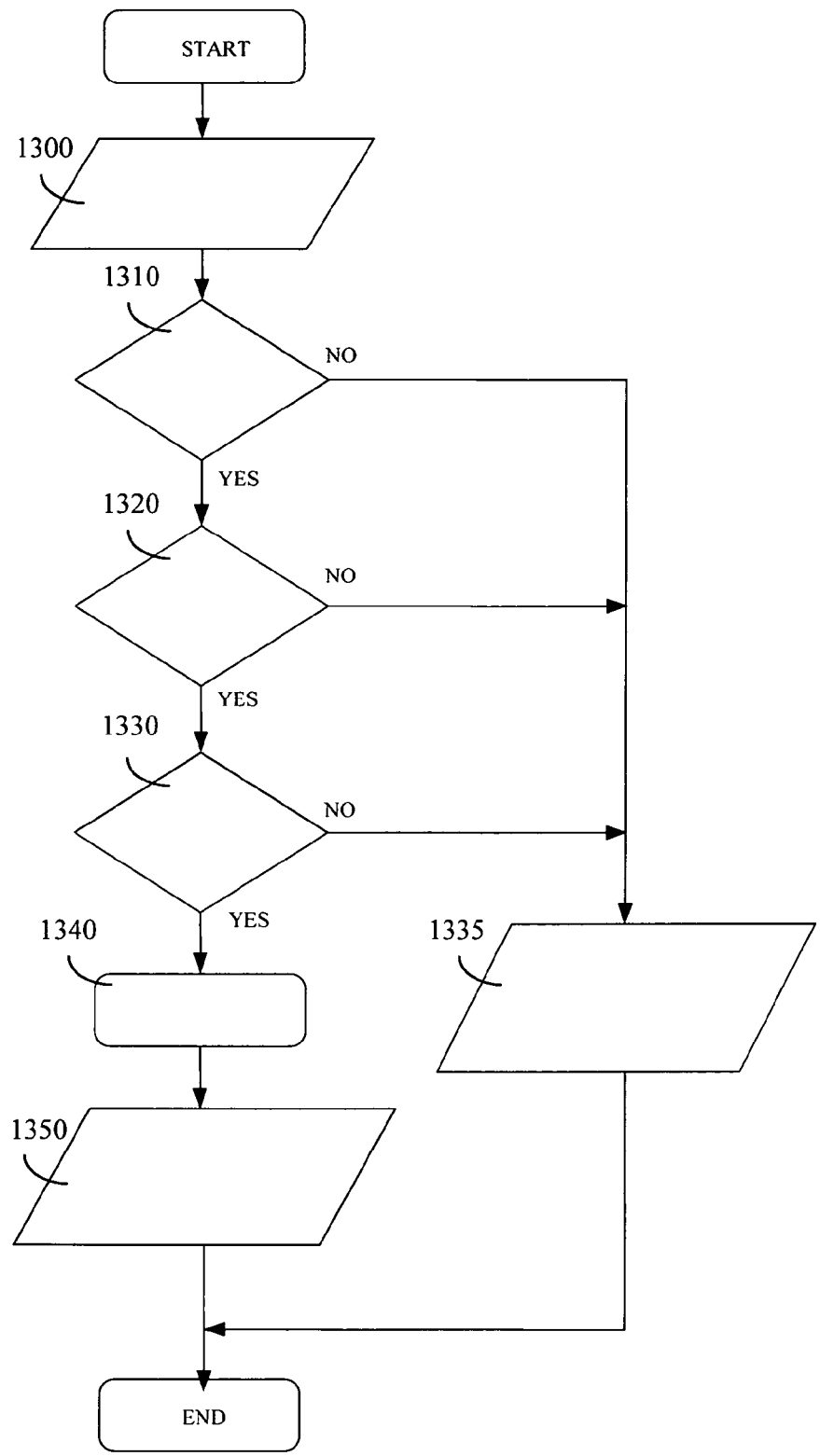
FIG. 13 shows a procedure according to an embodiment of the invention, performed by a network's base radio station upon receiving a reconfiguration message.

The base station, upon receiving the CELL RECONFIGURATION COMMAND reconfiguration message (FIG. 13, step 1300), performs, for example, the following procedure.

If the required configuration is compatible with cell resources (namely the number of total resources RES$_{tot}$ is greater than or equal to the sum $A_{GSM}+A_{UMTS}$) (step 1310—YES), and if the number of required GSM resources $A_{GSM}$ is not less than the current number of active GSM calls Calls$_{GSM}$ (step 1320—YES), and if the number of required UMTS resources $A_{UMTS}$ is not less than the current number of active UMTS calls Calls$_{UMTS}$ (step 1330—YES), the reconfiguration is performed (step 1340).

If the reconfiguration succeeds, a CELL RECONFIGURATION COMPLETE confirmation message is then sent to the radio controller (step 1350) containing the cell identifier.

If the reconfiguration cannot be made (steps 1310—NO, 1320—NO, 1330—NO), a CELL RECONFIGURATION FAILURE confirmation message is sent to the radio controller (step 1335), containing the cell identifier.

Upon receiving the CELL RECONFIGURATION COMPLETE reconfiguration message, the radio controller may, for example:
1. update the configuration of available resources for GSM by setting N$_{GSM}$=A$_{GSM}$;
2. update the configuration of available resources for UMTS by setting N$_{UMTS}$=A$_{UMTS}$;
3. if AddCarrier$_{GSM}$ is present:
   a. add the AddCarrier$_{GSM}$ frequency in ActiveFreq$_{GSM}$
4. if DropCarrier$_{GSM}$ is present:
   a. cancel the DropCarrier$_{GSM}$ frequency from ActiveFreq$_{GSM}$;
   b. add such DropCarrier$_{GSM}$ frequency to AvailableFreq$_{GSM}$ of the cell under consideration if the frequency is one of those licensed to the network operator, otherwise if the released frequency is external, do nothing.
5. if AddCarrier$_{UMTS}$ is present:
   a. add the AddCarrier$_{UMTS}$ frequency in ActiveFreq$_{UMTS}$.
6. if DropCarrier$_{UMTS}$ is present:
   a. cancel the DropCarrier$_{UMTS}$ frequency in ActiveFreq$_{UMTS}$;
   b. add such DropCarrier$_{UMTS}$ frequency in AvailableFreq$_{UMTS}$ of this cell if the frequency is one of those licensed to the network operator, otherwise if the released frequency is external, do nothing.
7. if AddCode$_{UMTS}$ is present:
   a. add AddCode$_{UMTS}$ to AreaActiveCode$_{UMTS}$.
8. if DropCode$_{UMTS}$ is present:
   a. cancel the code DropCode$_{UMTS}$ from AreaActiveCode$_{UMTS}$.
   b. add the code DropCode$_{UMTS}$ in AreaAvailableCode$_{UMTS}$.
9. reset $A_{GSM}$, $A_{UMTS}$, AddCarrier$_{GSM}$, DropCarrier$_{GSM}$, AddCarrier$_{UMTS}$, DropCarrier$_{UMTS}$, AddCoder$_{UMTS}$, DropCode$_{UMTS}$.

Upon receiving the CELL RECONFIGURATION FAILURE reconfiguration message, the radio controller may:
1. reset $A_{GSM}$ and $A_{UMTS}$;
2. if AddCarrier$_{GSM}$ is present:
   a. decrease the value of N$_{tot}$ proportionally to the new amount of resources that have not been added due to the failure;
   b. add such AddCarrier$_{GSM}$ frequency to the lists AvailableFreq$_{GSM}$ of this cell if the frequency is one of those licensed to the network operator, while if the frequency is an external frequency, do nothing;
3. if AddCarrier$_{UMTS}$ is present:
   a. decrease the value of N$_{tot}$ proportionally to the new amount of resources that have not been added due to the failure.
   b. add such AddCarrier$_{UMTS}$ to the list AvailableFreq$_{UMTS}$ of this cell and of the neighboring cells, if the frequency AddCarrier$_{UMTS}$ is one of those licensed to the network operator, otherwise do nothing.
4. If AddCode$_{UMTS}$ is present:
   a. decrease the value of the counter N$_{tot}$ proportionally to the resources not added due to the failure;
   b. add the code AddCode$_{UMTS}$ to the lists AreaAvailableCode$_{UMTS}$ of the radio controller that manages the cell.
5. if DropCarrier$_{GSM}$ is present:
   a. increase then value of the counter N$_{tot}$ proportionally to the new amount of resources that have not been removed due to the failure.
6. if DropCarrier$_{UMTS}$ is present:
   a. increase the value of the counter N$_{tot}$ proportionally to the new amount of resources that have not been removed due to the failure.
8. if DropCode$_{UMTS}$ is present:
   a. increase the value of the counter N$_{tot}$ proportionally to the new amount of resources that have not been removed due to the failure.
7. reset AddCarrier$_{GSM}$, DropCarrier$_{GSM}$, AddCarrier$_{UMTS}$, DropCarrier$_{UMTS}$.

Upon reception of all the CELL_RECONFIGURATION_COMPLETE messages and/or of all the CELL_RECONFIGURATION_FAILURE messages, the flag UNDER_RECONFIG is set to FALSE.

Then, the percentage of reconfigurations is calculated as % Reconfig=(N_config/N_RAT*N_cell), where N_RAT is the number of RATs in operation (in the example herein considered, N=2, because the RATs are the GSM system and the UMTS system), and N_cell is the number of cells in the area being considered.

If % Reconfig<T_THR_INCREASE it means that the time period T is too short, and should be increased of a percentage ΔT_INCREASE; otherwise, the time period T is not changed.

If % Reconfig>T_THR_DECREASE it means that the time period T is too long and should be decreased of the percentage ΔT_DECREASE; otherwise, the time period T is not changed.

If one or more external frequencies have to be released after a certain time interval, the algorithm deactivates the frequency(ies), and releases it (them).

The area considered by the algorithm may correspond to any geographic area, for example a group of cells managed by a radio controller (RNC o BSC), the area of an MSC or a SGSN, or an area managed by an O&M (Operation & Maintenance) network node. In case a radio interface having a flat RAN architecture (i.e., without any radio controller), like for example in the HSPA evolution or E-UTRAN (aka LTE), the algorithm may also reside within a NodeB, and exploit the standard functionalities (e.g. SON—Self Organizing Network).

Alternatively, the variable UNDER_RECONFIG can be set to TRUE not at the beginning of the second macro-step, but rather when a reconfiguration is firstly needed.

Another variant relates to the operations performed at the beginning of the second macro-step, when the variable UNDER_RECONFIG is TRUE. In particular, instead of not performing the operations for the cells from which confirmation is still expected, the operations could not be performed for all the cells of the considered area.

In alternative to what stated above, the parameter % Reconfig may also be calculated as N_config/N_cell, where N_cell is the number of cells of the area under consideration. In such case, the counter N_config has to be incremented only once for each considered cell, taking into account all the RATs present in that cell.

As pointed out in the example, the method for reconfiguring a cellular network as described allows reconfiguring the cells managed by a plurality of base stations by transferring, within the network managed by a radio controller, radio resources:
  within a cell, for example in case of many systems; and/or
  from less loaded cells to more loaded cells, in case of one or more systems.

The cells, according to the present embodiment, are reconfigured independently from the base station that manages the cells, thereby allowing to optimise the cellular network behaviour in an area covered by a plurality of base stations.

In the embodiment of the invention described as an example, the managed cellular radio-mobile systems are GSM/GPRS/EDGE and UMTS.

As a person skilled in the art can observe, the invention can also be applied to other cellular and wireless systems, such as, for example, HSPA and HSPA Evolution, CDMA One, CDMA 2000, WLAN (802.11x), 802.16 (WiMAX), E-UTRAN, DVB-T, DVB-S, DVB-H, that comprise re-configurable base radio stations. For example, as HSPA and HSPA Evolution are evolutions of the UMTS system and are therefore based on the CDMA access technique, what has been described above for the UMTS can also be applied to these kind of systems. As an additional example, systems E-UTRAN and WiMAX are based on the OFDMA access technique, i.e. time-frequency matrix resource allocation where the time is slotted in TTI (Transmission Time Interval) and the bandwidth assigned to each sub-carrier is fixed (e.g. 15 kHz for E-UTRAN). In this context, what has been described above for the GSM can also be applied to these systems. In the example, reference has been made to reconfigurable base stations that are able to manage two radio systems and the method has been described in detail for such type of example. In alternative embodiments, the method can also be applied in cellular networks comprising reconfigurable base stations that are able to manage a single type of system.

Alternatively, as a person skilled in the art can appreciate, the method can also be applied in cellular networks comprising reconfigurable base stations that are able to manage more than two types of system.

According to the invention, the communication protocol for reconfiguration messages between radio controller 10 and base station (BS1, BS2, . . . , BSk) provides for the use of protocol messages transmitted on a specific communication channel that is independent from the system being used.

Further embodiments of the invention can for example provide for using, as a communication channel, one of the channels present in the system considered, for example one of the channels provided by the standard for the system being used (for example Abis interface for GSM or Iub interface for UMTS). To this purpose modifications to related interface managing protocols of communication channels between radio controller 10 and base station (BS1, BS2, . . . , BSk), for example Base Transceiver Station Management—BTSM for GSM and NodeB Application Part—NBAP for UMTS, can be made by inserting protocol messages, respective fields and related procedures as described.

The description of a preferred embodiment of the invention provides that the initial operating condition of the procedure is based on the frequency planning performed, for example, by the operator.

A possible alternative can provide that the initial operating condition of the procedure starts with an absent frequency planning, namely in which $PlannedFreq_{GSM}$ and $PlannedFreq_{UMTS}$ quantities are empty; in such case, when executing the two macro-steps, the method according to the invention automatically determines the frequencies to be used in each cell without the need of an operator's intervention to define the frequency planning beforehand.

The description of the preferred embodiment has identified the frequency as a GSM radio resource or channel, and a frequency-scrambling code pair as a UMTS radio resource. However, the identified radio resource can also be, within the cellular network, a time slot or a combination of frequency, timeslot, scrambling code, and therefore further embodiments can provide for the use of such resources for implementing the method.

The described architecture related to a single radio controller configured for checking and reconfiguring a plurality of cells by means of a plurality or reconfigurable base stations.

Alternative embodiments can provide an architecture that comprises a plurality of mutually inter-connected radio controllers that are configured for exchanging data and messages and for extensively applying the method according to the invention; for example, by exchanging radio resources or channels among the cells controlled by the different radio controllers.

The invention as described allows dynamically reconfiguring the network cells in order to assign more radio resources to the more loaded cells, by taking such resources from less loaded cells. The reconfiguration is only performed when an assessment that the forecasted impact on the network operation deriving from the addition of a radio resources ensures that the radio quality is maintained sufficiently high.

Alternative embodiments can allow the operator to reconfigure radio apparatus or base stations by converting them from initial configurations associated with obsolete or previously-introduced systems into new configurations associated with new systems, when the amount of network cells traffic changes. Such further embodiment would be useful for dynamically managing the network transformation from one system to another, by progressively following the traffic evolution towards the newly-introduced system.

It will be appreciated that obvious modifications or variations are possible to the above description, as regards sizes, shapes, materials, components, circuit elements, connections, as well as in construction details and operating method, shown merely as a non-limiting example, without departing from the invention.

The invention claimed is:

1. A method for configuring a wireless telecommunications network being adapted to operate according to at least one radio system, comprising a plurality of re-configurable base radio stations, wherein each base radio station is adapted to manage one or more cells of said telecommunications network and wherein each cell has corresponding radio resources available, comprising:
obtaining measurements of a load status of one or more cells; and
dynamically configuring at least one of the cells by assigning thereto determined available radio resources depending on measurements of the cell load status,
wherein said dynamically configuring comprises:
based on the measurements of the cell load status, determining at least one candidate radio resource to be assigned to the cell;
prior to assigning the candidate radio resource to the cell, forecasting an impact on network performance at a radio level potentially caused by the assignment of the candidate radio resource to the cell, wherein the forecasting an impact on the network performance comprises forecasting a resultant signal-to-noise ratio and comparing the forecasted signal-to-noise ratio to a predetermined signal-to-noise ratio, wherein the forecasting a resultant signal-to-noise ratio comprises, depending on the measured cell load status, one of:
a) estimating a re-use distance of the radio resource, or
b) calculating the signal-to-noise ratio based on simulations; and
in case the forecasted impact complies with predetermined requirements, assigning the candidate radio resource to the cell.

2. The method of claim 1, wherein said predetermined signal-to-noise ratio is a minimum value being adapted to guarantee the service provided by the wireless telecommunications network.

3. The method of claim 1, wherein forecasting an impact on the network performance at the radio level comprises assessing whether a cell load factor in uplink does not exceed a predetermined load factor threshold.

4. The method of claim 1, wherein forecasting an impact on the network performance at the radio level comprises assessing whether a cell transmission power is sufficient for sustaining the assignment of the candidate radio resource.

5. The method of claim 1, wherein said assigning the candidate radio resource to the cell comprises transferring the candidate radio resource from another cell.

6. The method of claim 1, wherein obtaining measurements of the load status of one or more cells comprises measuring in a selected time interval:
an amount of radio traffic in said cells for each of the at least one radio system; and
an amount of available and/or unavailable radio resources in said cells for each of the at least one radio system.

7. The method according to claim 6, wherein measuring in a selected time interval said amount of traffic and said amount of radio resources comprises measuring at least one set of data selected from:
a list of radio frequencies assigned and in-use to each one of said cells for each of the at least one radio system;
a list of codes assigned and in-use to each of said cells for each of the at least one radio system;
a list of time slots assigned and in-use to each one of said cells for each of the at least one radio system;
a number of radio frequencies assigned and in-use to each one of said cells for each of the at least one radio system;
a number of codes assigned and in-use to each one of said cells for each of the at least one radio system; and
a number of time slots assigned and in-use per system to each one of said cells.

8. The method according to claim 1, wherein said dynamically configuring at least one cell comprises:
measuring parameters representing a ratio between number of unsatisfied requests and total number of performed requests in each one of said cells for each of the at least one radio system;
based on said measuring parameters, determining, for each of said at least one radio system and for each one of the network cells, a block index having a value representing block conditions or status of each one of said cells;
ordering said cells according to a priority order determined by said block index; and
reconfiguring said set of cells depending on said priority order.

9. The method of claim 1, wherein said network is capable of being adapted to operate according to a plurality of cellular systems and wherein dynamically reconfiguring at least one cell comprises:
determining a load parameter for each cellular system of said plurality computed depending on a load status measured for each cell and for a system of said plurality and depending on global load status measured per cell for said plurality of systems; and
using said load parameter per system for transferring said determined radio resources in at least one cell from a first to at least one second system of said plurality of systems.

10. The method of claim 9, wherein said at least one cellular system is in a system selected from:
a system of the GSM type and its evolutions;
a system of the UMTS type, its evolutions, HSPA evolution and E-UTRA;
a system of the CdmaOne type and its evolutions;
a system of the Cdma2000 type and its evolutions;
a system of the 802.11 family and its evolutions;
a system of the 802.16 or 802.20 families and their evolutions; and
a system of the DVB-T, DVB-S, DVB-H or DAB type.

11. A radio resources managing entity for configuring a wireless telecommunications network comprising a processor and memory and being adapted to operate according to at least one radio system, the radio resources managing entity being configured for implementing the method according to claim 1.

12. A wireless telecommunications network comprising a radio resources managing entity according to claim 11.

13. A non-transitory computer-readable medium storing a computer program product adapted to be loaded into a memory of at least one computer or system of computers and comprising portions of software code performing the method according to claim 1 when executed on said computer or system of computers.

* * * * *